US012422886B2

(12) United States Patent
Choi et al.

(10) Patent No.: US 12,422,886 B2
(45) Date of Patent: Sep. 23, 2025

(54) ELECTRONIC DEVICE INCLUDING DRIVE MOTOR

(71) Applicant: Samsung Electronics Co., Ltd., Suwon-si (KR)

(72) Inventors: Junyoung Choi, Suwon-si (KR); Wonho Lee, Suwon-si (KR); Junyoung Lee, Suwon-si (KR); Sukdong Kim, Suwon-si (KR); Soohyun Seo, Suwon-si (KR); Byounguk Yoon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 115 days.

(21) Appl. No.: 18/467,146

(22) Filed: Sep. 14, 2023

(65) Prior Publication Data

US 2024/0094770 A1    Mar. 21, 2024

Related U.S. Application Data

(63) Continuation of application No. PCT/KR2023/013498, filed on Sep. 8, 2023.

(30) Foreign Application Priority Data

Sep. 16, 2022   (KR) .................. 10-2022-0116821
Oct. 7, 2022    (KR) .................. 10-2022-0128608

(51) Int. Cl.
  *G06F 1/16*    (2006.01)
  *F16H 48/08*   (2006.01)

(52) U.S. Cl.
  CPC ........... *G06F 1/1624* (2013.01); *F16H 48/08* (2013.01); *G06F 1/1652* (2013.01); *F16H 2048/087* (2013.01)

(58) Field of Classification Search
  CPC ........ G06F 1/1677; G06F 1/1637; G06F 1/16; G06F 1/1643; G06F 1/1601;
  (Continued)

(56) References Cited

U.S. PATENT DOCUMENTS 5,274,882 A * 1/1994 Persson ............... H04M 1/0216
                                                16/229
6,688,551 B1 * 2/2004 He ......................... A47K 10/40
                                                428/905

(Continued)

FOREIGN PATENT DOCUMENTS

CN      113129758       7/2021
CN      113810523 A    12/2021
(Continued)

OTHER PUBLICATIONS

Search Report dated Dec. 14, 2023 in International Patent Application No. PCT/KR2023/013498.
(Continued)

*Primary Examiner* — Abhishek M Rathod
(74) *Attorney, Agent, or Firm* — Nixon & Vanderhye, P.C.

(57) ABSTRACT

An example electronic device may include a first housing, a second housing coupled to be slidable from the first housing, a flexible display supported by the first housing and the second housing and having a display area that varies based on the second housing being slid in or slid out. The electronic device may include a stopper assembly disposed in the first housing. The stopper assembly may include a stopper body elastically coupled to at least a portion of the first housing, and a pressing member coupled to the stopper body and configured to come into contact with a protrusion located in the second housing, wherein, in a slide-out state, the stopper body is at least partially disposed in a recess in (Continued)

the second housing by pressure from the pressing member being pressed by the protrusion.

20 Claims, 30 Drawing Sheets

(58) Field of Classification Search
CPC .... G06F 1/1616; G06F 1/1622; G06F 1/1626; G06F 1/163; G06F 1/1641; G06F 1/1675; G06F 1/1679; G06F 1/1684; G06F 1/1686; G06F 1/169; G06F 1/1698; H05K 5/0217; H05K 5/0221; H05K 5/10; H05K 7/1401; F16B 21/165; F16B 21/0266; F16B 21/065
See application file for complete search history.

(56) References Cited

U.S. PATENT DOCUMENTS

| | | | | |
|---|---|---|---|---|
| 9,694,490 | B2* | 7/2017 | Wang | B25H 3/028 |
| 11,283,910 | B2* | 3/2022 | Lee | G06F 1/1652 |
| 11,457,104 | B2 | 9/2022 | Seol et al. | |
| 11,460,888 | B2 | 10/2022 | Cha et al. | |
| 2011/0149492 | A1 | 6/2011 | Nakao et al. | |
| 2016/0147261 | A1 | 5/2016 | Bohn et al. | |
| 2019/0305237 | A1 | 10/2019 | Shin et al. | |
| 2020/0020255 | A1* | 1/2020 | Yoon | G06F 1/1656 |
| 2021/0185835 | A1* | 6/2021 | Song | G02F 1/133314 |
| 2021/0306446 | A1* | 9/2021 | Choi | H04N 23/54 |
| 2022/0066510 | A1* | 3/2022 | Cha | G06F 1/1677 |
| 2022/0132689 | A1 | 4/2022 | Lee | |
| 2022/0166865 | A1* | 5/2022 | Seol | H04M 1/0268 |
| 2022/0326737 | A1* | 10/2022 | Ran | G06F 1/1652 |
| 2023/0164248 | A1* | 5/2023 | Park | H04M 1/0237 |
| | | | | 455/575.4 |
| 2024/0080383 | A1* | 3/2024 | Song | G06F 1/1652 |

FOREIGN PATENT DOCUMENTS

| | | |
|---|---|---|
| KR | 10-2020-0007366 | 1/2020 |
| KR | 10-2022-0056294 | 5/2022 |
| WO | 2013/062224 | 5/2013 |
| WO | 2021/201316 | 10/2021 |
| WO | 2021/206203 | 10/2021 |
| WO | 2022/045396 | 3/2022 |
| WO | 2022/114265 | 6/2022 |
| WO | 2022/158622 | 7/2022 |

OTHER PUBLICATIONS

Written Opinion dated Dec. 14, 2023 in International Patent Application No. PCT/KR2023/013498.
Extended Search Report dated Jul. 2, 2025 in European Application No. 23865799.3.

* cited by examiner

ELECTRONIC DEVICE INCLUDING DRIVE MOTOR

CROSS-REFERENCE TO RELATED APPLICATIONS

This application is a continuation of International Application No. PCT/KR2023/013498, designating the United States, filed Sep. 8, 2023, in the Korean Intellectual Property Receiving Office, which claims priority to Korean Patent Application No. 10-2022-0116821, filed Sep. 16, 2022, in the Korean Intellectual Property Office and to Korean Patent Application No. 10-2022-0128608, filed Oct. 7, 2022, in the Korean Intellectual Property Office. The disclosures of each of these applications are incorporated herein in their entireties.

BACKGROUND

Field

The disclosure relates to an electronic device including a drive motor.

Description of Related Art

Electronic devices are gradually becoming slimmer and more rigid, being strengthened in design aspects, and being improved to differentiate functional elements thereof. Electronic devices are being gradually transformed from a uniform rectangular shape into various shapes. An electronic device may have a transformable structure that is convenient to carry and enables the use of a large-screen display. The electronic device may have a structure capable of making the display area of a flexible display (e.g., a rollable display) variable by supporting housings that operate in a sliding manner relative to each other (e.g., a rollable structure or a slidable structure). This electronic device may include a drive mechanism (e.g., a drive motor) configured to allow, with respect to one housing, a remaining housing to automatically slide.

SUMMARY

An electronic device may, for example, include a rollable electronic device in which the display area of a flexible display is expandable and/or contractible (e.g., a slidable electronic device). The rollable electronic device may include a first housing and a second housing that are coupled to each other to be movable relative to each other by being at least partially fitted together. For example, the first housing and the second housing may be slidably operated with respect to each other and support at least a portion of a flexible display (e.g., a rollable display, an expandable display, or a stretchable display), whereby, in a slide-in state, the flexible display may be guided to have a first display area, and, in a slide-out state, the flexible display may be guided to have a second display area that is greater than the first display area.

The electronic device may include a drive motor including a drive module having a pinion gear that operates the second housing to automatically slide with respect to the first housing, and a rack gear gear-coupled with the pinion gear. When the drive motor is driven and the gearing operation is performed while the pinion gear and the rack gear are gear-coupled with each other, the electronic device may automatically perform the sliding operation. The drive motor may have a back drive force that restricts the rotation of the pinion gear in a stopped state. With this reverse driving force, in the electronic device, the position of the second housing relative to the first housing may be fixed in the slide-out and/or slide-in state.

However, in the slide-out state in which the second housing is moved out from the first housing, when an external impact (such as a drop) occurs, the drive module including the pinion gear and the rack gear gear-coupled with each other by the reverse driving force may be damaged, and the electronic device may malfunction.

Various example embodiments of the disclosure may provide an electronic device including a drive motor configured to reduce damage to a drive module due to an external impact.

However, the problems to be solved by the technology of the disclosure are not limited to the above-mentioned problems, and other problems may be variously solved without departing from the spirit and scope of the disclosure.

According to various example embodiments, an electronic device may include a first housing, a second housing coupled to be slidable from the first housing, and a flexible display disposed to be supported by the first housing and the second housing and having a display area variable depending on whether the second housing is slid in or slid out. The electronic device may include a stopper assembly disposed in the first housing. The stopper assembly may include a stopper body elastically coupled to at least a portion of the first housing, and a pressing member coupled to the stopper body and configured to come into contact with a protrusion located in the second housing, wherein the slide-out state may be maintained when the stopper body is fastened to a recess in the second housing by the pressing member that is pressed by the protrusion.

According to various example embodiments, the electronic device may include a first housing, a second housing coupled to be slidable from the first housing and including a recess, and a flexible display disposed to be supported by the first housing and the second housing and having a display area variable depending on whether the second housing is slid in or slid out. The electronic device may include a drive motor disposed in the first housing and including a pinion gear, a rack gear disposed in the second housing to be gear-coupled with the pinion gear and including a protrusion at one end thereof, and a stopper assembly disposed in the first housing. The stopper assembly may include a first stopper facing the rack gear, a second stopper facing away from the first stopper, and an elastic member configured to press the first stopper and the second stopper in opposite directions between the first stopper and the second stopper, wherein, in a state in which the elastic force of the stopper assembly may be strengthened by the first stopper pressed by the protrusion, at least a portion of the second stopper is seated in the recess so that the slide-out state may be maintained.

According to various example embodiments, the electronic device may include a first housing, a second housing coupled to be slidable from the first housing and including a recess, and a flexible display disposed to be supported by the first housing and the second housing and having a display area variable depending on whether the second housing is slid in or slid out. The electronic device may include a drive motor disposed in the first housing and including a pinion gear, a rack gear disposed in the second housing to be gear-coupled with the pinion gear and including a protrusion at one end thereof, and a stopper assembly disposed in the first housing, wherein the rack gear may be disposed in the second housing to be movable by a predetermined reciprocating distance in the sliding direction of the second housing, and the slide-out state may be maintained when at least a portion of the stopper assembly is fastened to the recess by being pressed by the protrusion through movement of the rack gear.

An electronic device according to example embodiments of the disclosure includes a stopper assembly configured to maintain the position of the second housing in a slide-out state even when an external impact is applied, which may help to improve operational reliability of the electronic device.

In addition to this, various effects identified directly or indirectly through this disclosure may be provided.

Effects that are capable of being obtained by the disclosure are not limited to those described above, and other effects not described above may be clearly understood based on the following description.

BRIEF DESCRIPTION OF THE DRAWINGS

The above and other aspects, features and advantages of certain embodiments of the present disclosure will be more apparent from the following detailed description, taken in conjunction with the accompanying drawings, in which.

In connection with the description of the drawings, the same or similar components may be denoted by the same or similar reference numerals.

DETAILED DESCRIPTION

Figure 1:
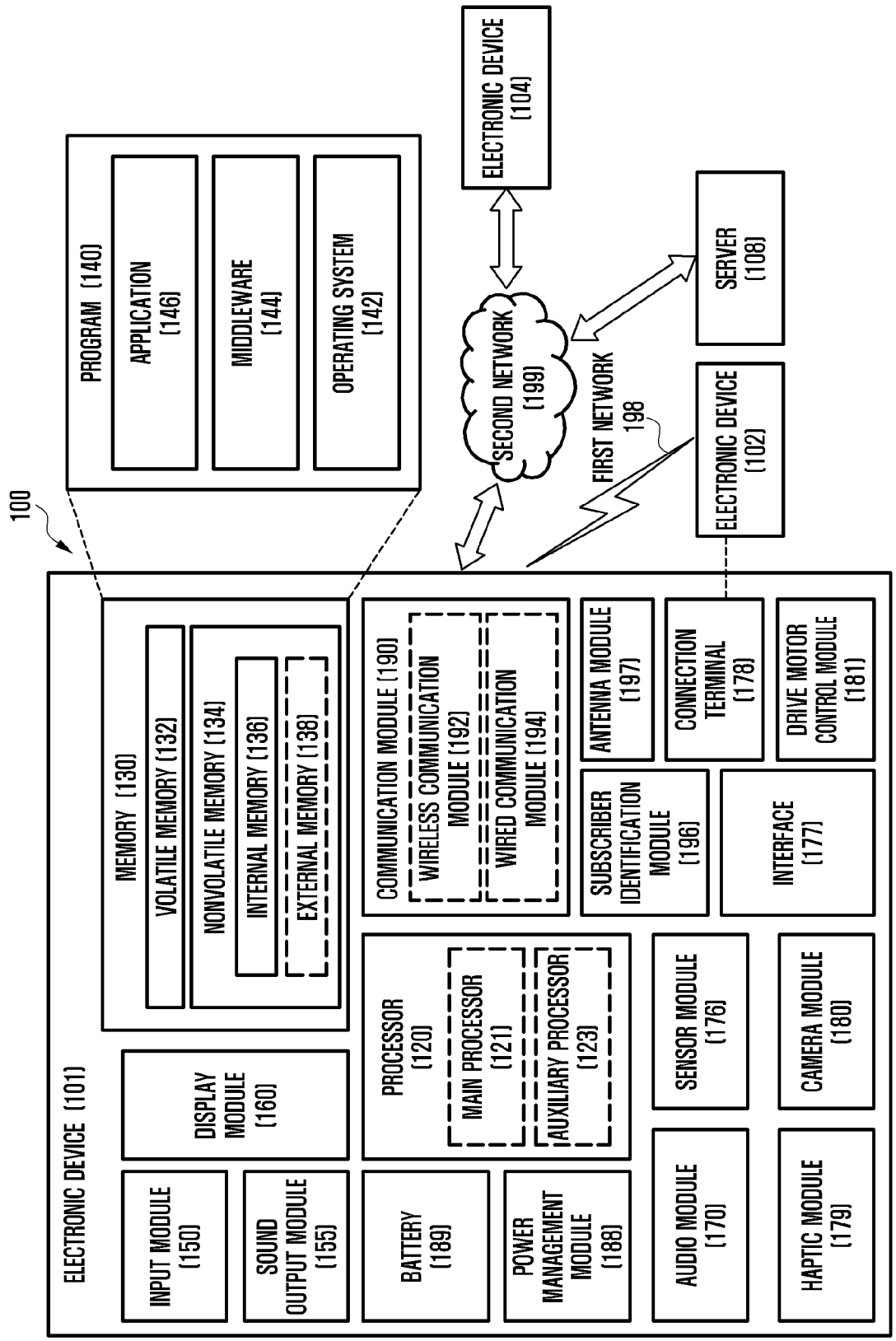
FIG. 1 is a block diagram of an example electronic device in a network environment according to various embodiments.

FIG. 1 is a block diagram illustrating an example electronic device in a network environment according to various embodiments.

Referring to FIG. 1, an electronic device 101 in a network environment 100 may communicate with an electronic device 102 via a first network 198 (e.g., a short-range wireless communication network), or an electronic device 104 or a server 108 via a second network 199 (e.g., a long-range wireless communication network). The electronic device 101 may communicate with the electronic device 104 via the server 108. The electronic device 101 includes a processor 120, memory 130, an input module 150, an audio output module 155, a display device 160, an audio module 170, a sensor module 176, an interface 177, a connection terminal 178, a haptic module 179, a camera module 180, a power management module 188, a battery 189, a communication module 190, a subscriber identification module (SIM) 196, or an antenna module 197. In various embodiments, at least one (e.g., the display device 160 or the camera module 180) of the components may be omitted from the electronic device 101, or one or more other components may be added in the electronic device 101. In various embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. As at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. The processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of, the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). The auxiliary processor 123 (e.g., an ISP or a CP) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134. The non-volatile memory 134 may include internal memory 136 and external memory 138.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, or a digital pen (e.g., a stylus pen).

The audio output module 155 may output sound signals to the outside of the electronic device 101. The audio output module 155 may include, for example, a speaker or a receiver. The speaker may be used for general purposes, such as playing multimedia or playing record, and the receiver may be used for incoming calls. The receiver may be implemented as separate from, or as part of, the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. The display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. The audio module 170 may obtain the sound via the input module 150, or output the sound via the audio output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. The sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. The interface 177 may include, for example, a high definition multimedia interface (HDMI), a universal serial bus (USB) interface, a secure digital (SD) card interface, or an audio interface.

A connection terminal 178 may include a connector via which the electronic device 101 may be physically connected with the external electronic device (e.g., the electronic device 102). The connection terminal 178 may include, for example, a HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via tactile sensation or kinesthetic sensation. The haptic module 179 may include, for example, a motor, a piezoelectric element, or an electric stimulator.

The camera module 180 may capture an image or moving images. The camera module 180 may include one or more lenses, image sensors, image signal processors, or flashes.

The power management module 188 may manage power supplied to the electronic device 101. The power management module 188 may be implemented as at least part of, for example, a power management integrated circuit (PMIC).

The battery 189 may supply power to at least one component of the electronic device 101. The battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the AP) and supports a direct (e.g., wired) communication or a wireless communication. The communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102 or 104, or the server 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 4:
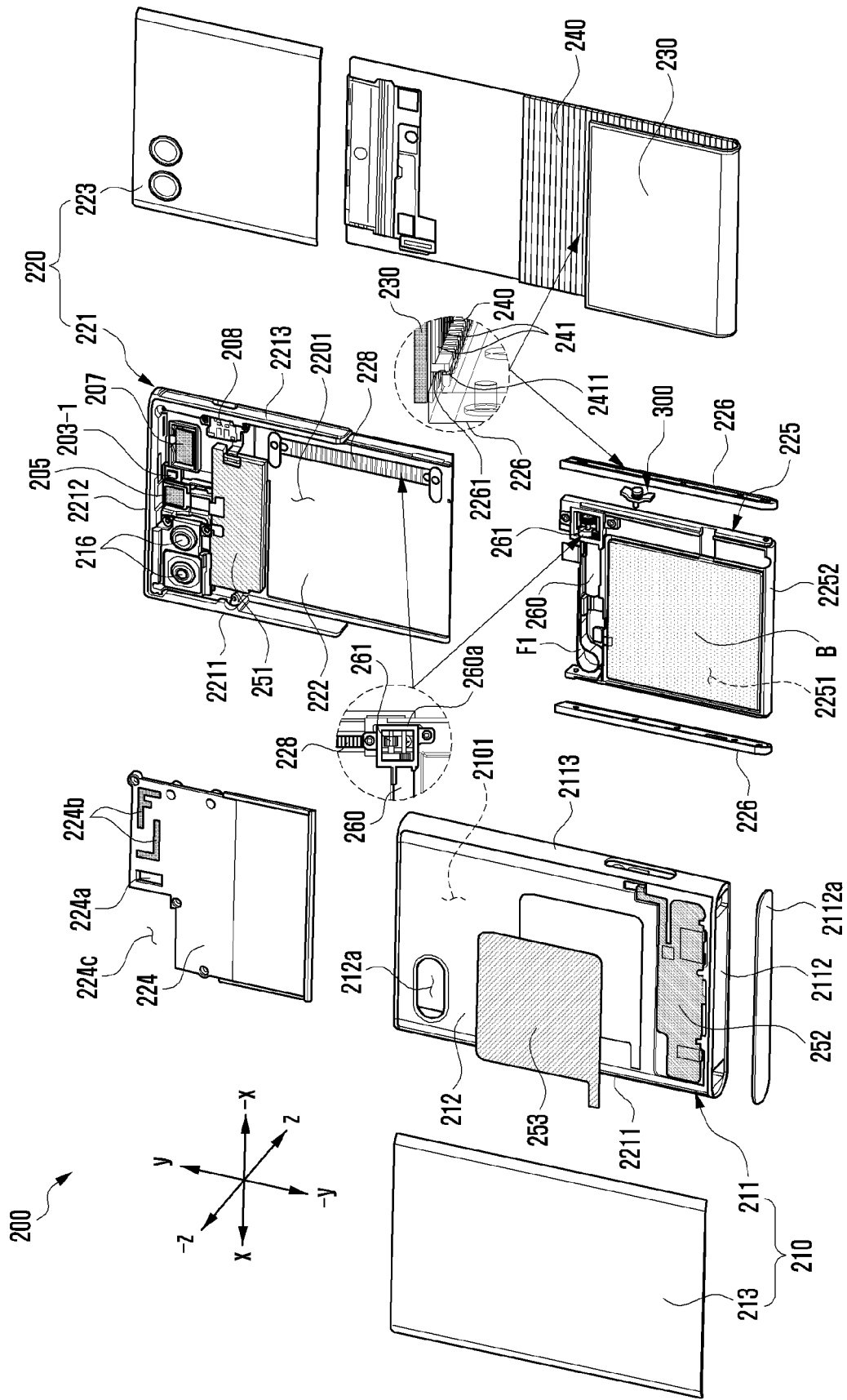
FIG. 4 is an exploded perspective view of an example electronic device according to various embodiments.

According to various embodiments, the sensor module 176 may include a moving distance detection sensor configured to detect the moving distance of the second housing (e.g., the second housing 220 in FIG. 4) from the first housing (e.g., the first housing 210 in FIG. 4) of an electronic device (e.g., the electronic device 200 in FIG. 4). In an embodiment, when the second housing 220 is moved from the first housing 210, the sensor module 176 may detect a slide-in state, a slide-out state, or an intermediate state between the slide-in state and slide-out state. In various embodiments, the processor 120 may be configured to detect the moving distance in real time via the sensor module 176 while the second housing 220 is moving from the first housing 210 and to control the display module 160 to display an object corresponding to a changing display area via a flexible display (e.g., the flexible display 230 in FIG. 4). In an embodiment, the electronic device 101 may include a drive motor control module 181 configured to control the operation of a drive motor (e.g., a DC motor or a stepping motor) (e.g., the drive motor 260 in FIG. 4) disposed inside the electronic device 101. For example, the processor 120 may appropriately control the driving force or rotating speed of the drive motor 260 by controlling the drive motor control module 181 based on the moved position of the second housing (e.g., the second housing 220 in FIG. 4) detected by the sensor module 176. In various embodiments, the drive motor control module 181 may be replaced or supplemented by the processor 120.

Figure 2A:
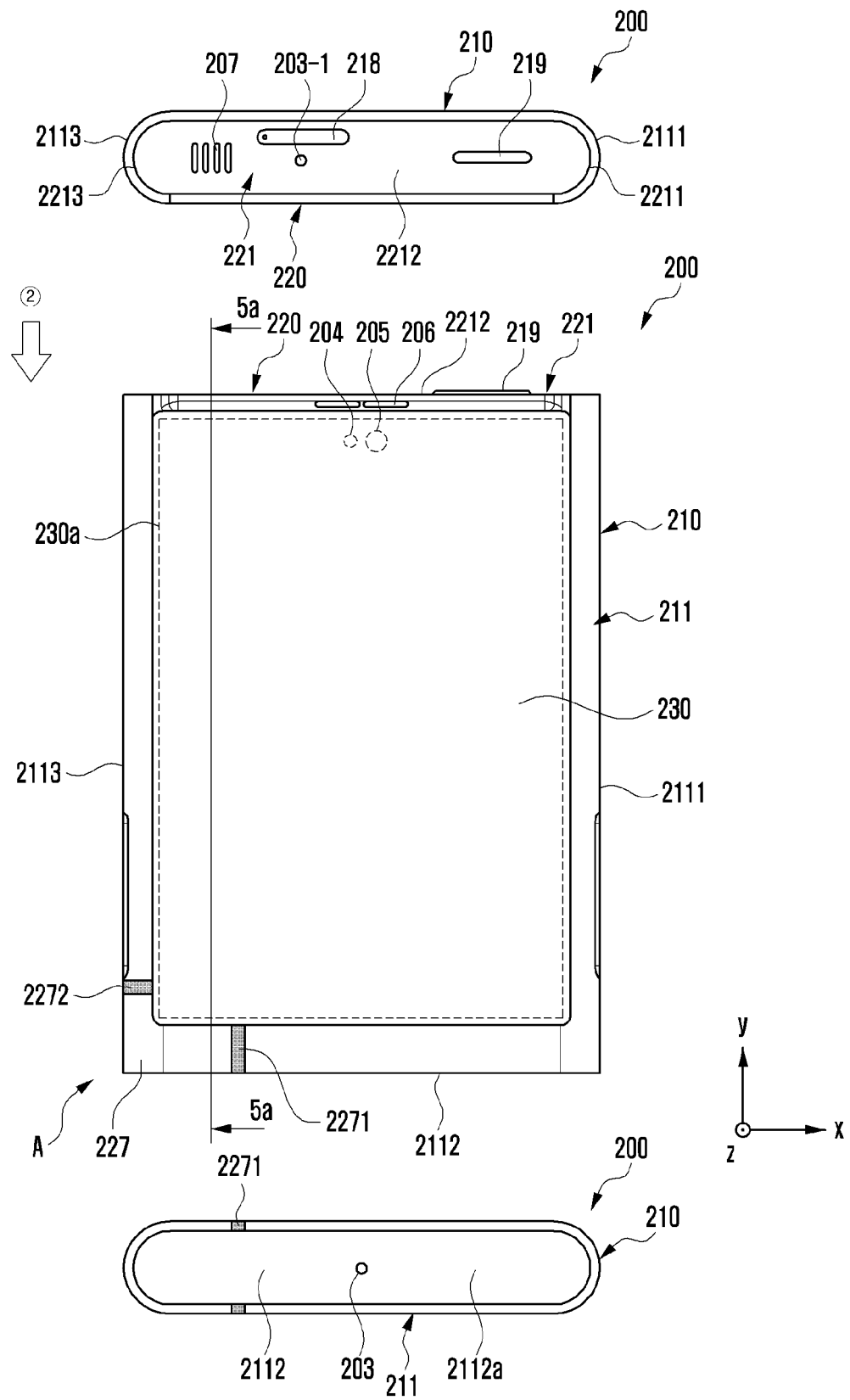
FIGS. 2A and 2B are views illustrating front and rear surfaces of an example electronic device in a slide-in state according to various embodiments.
Figure 2B:
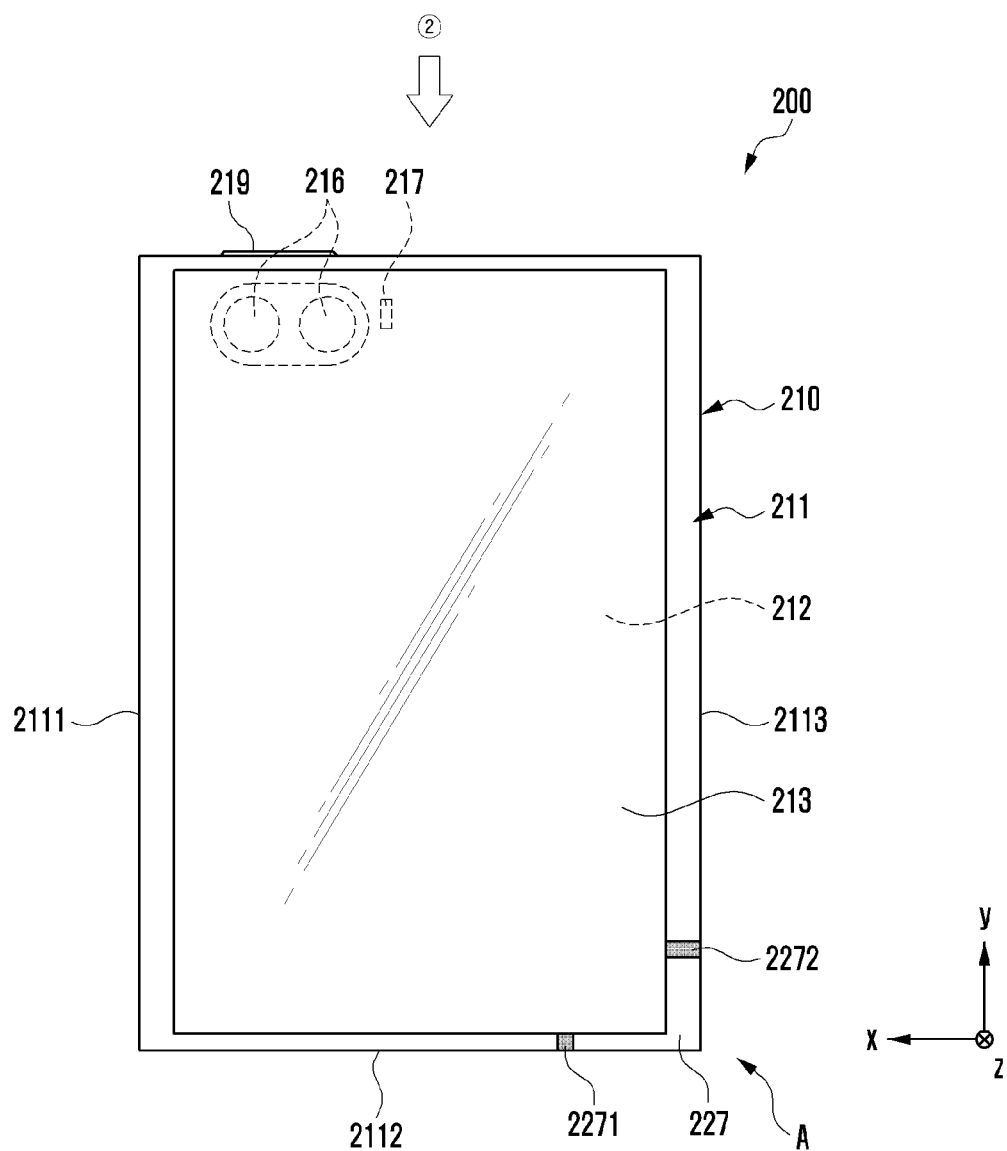
Figure 3A:
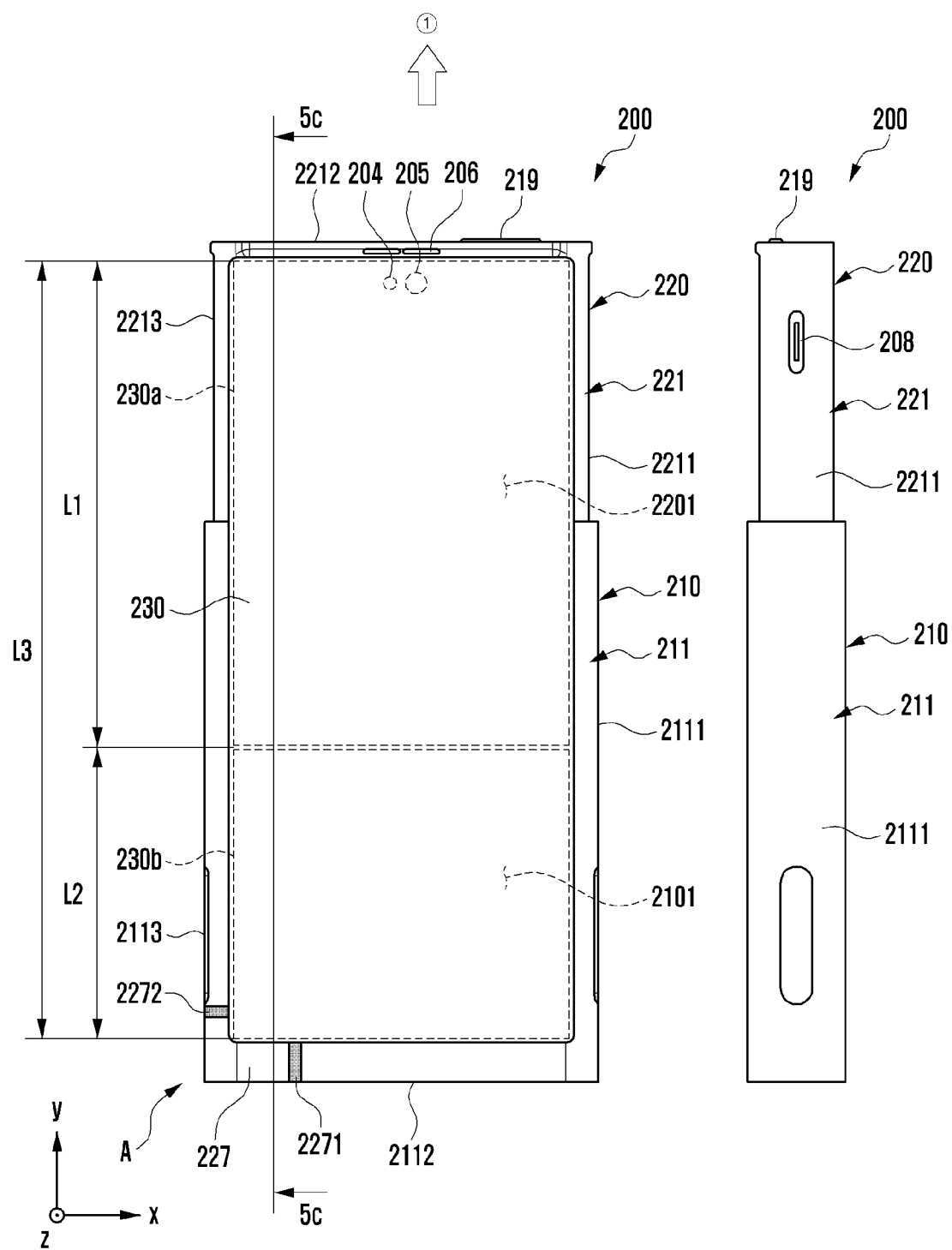
FIGS. 3A and 3B are views illustrating front and rear surfaces of an example electronic device in a slide-out state according to various embodiments.
Figure 3B:
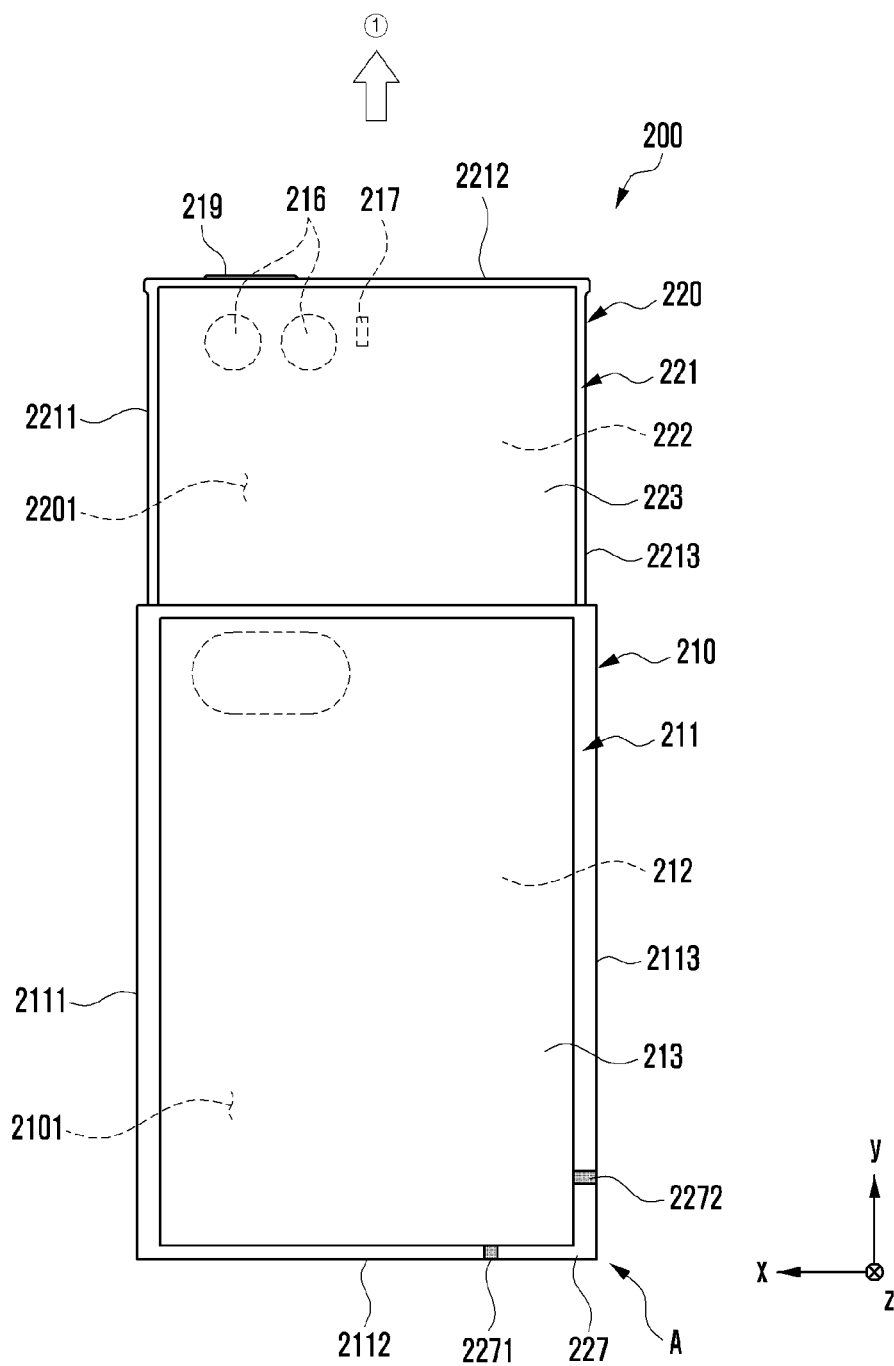

FIGS. 2A and 2B are views illustrating front and rear surfaces of an example electronic device in a slide-in state according to various embodiments of the disclosure. FIGS. 3A and 3B are views illustrating front and rear surfaces of an example electronic device in a slide-out state according to various embodiments of the disclosure.

The electronic device 200 of FIGS. 2A to 3B may be at least partially similar to the electronic device 101 of FIG. 1 or may further include other embodiments of the electronic device.

Referring to FIGS. 2A, 2B, 3A, and 3B, the electronic device 200 may include a first housing 210, a second housing 220 coupled to be slidable in a predetermined direction (e.g., in direction ① or direction ②) (e.g., the ±y-axis direction) from the first housing 210, and a flexible display 230 (e.g., a rollable display, an expandable display, or a stretchable display) disposed to be supported by at least a portion of the first and second housings 210 and 220. In an embodiment, the second housing 220 may be slidably coupled to the first housing 210 to be extended in a first direction (direction ①) or retracted in a second direction (direction ③)) opposite to the first direction (direction ①)) with respect to the first housing 210. In an embodiment, the electronic device 200 may be switched to the slide-in state (e.g., a retraction state) when at least a portion of the second housing 220 is accommodated in at least a portion of a first space 2101 defined by the first housing 210. In an embodiment, the electronic device 200 may be switched to the slide-out state (e.g., an extension state) by when at least a portion of the second housing 220 is moved from the first space 2101 in the outward direction (e.g., direction ①). In an embodiment, the electronic device 200 may include a support member (e.g., the support member 240 in FIG. 4) (e.g., a bendable member, a bendable support member, an articulated hinge module, or a multi-bar assembly), which at least partially defines the same plane as at least a portion of the second housing 220 in the slide-in state and which is at least partially bent and accommodated into the first space 2101 in the first housing 210 in the slide-in state. In an embodiment, the flexible display 230 may be disposed in such a way that at least a portion thereof is attached to at least a portion of the second housing 220. In an embodiment, the remaining portion of the flexible display 230 may be at least partially attached to the support member 240 (e.g., the support member 240 in FIG. 4). In an embodiment, in the slide-in state, at least a portion of the flexible display 230 may be disposed to be invisible from the outside by being bent and accommodated into the first space 2101 of the first housing 210 while being supported by the support member (e.g., the support member 240 in FIG. 4). In an embodiment, in the slide-out state, at least a portion of the flexible display 230 may be disposed to be visible from the outside while being supported by the support member (e.g., the support member 240 in FIG. 4), which at least partially defines the same plane as the second housing 220.

According to various embodiments, the electronic device 200 may include a first housing 210 including a first side surface member 211 and a second housing 220 including a second side surface member 221. In an embodiment, the first side surface member 211 may include a first side surface 2111 having a first length along a first direction (e.g., the y-axis direction), a second side surface 2112 extending from the first side surface 2111 along a direction substantially perpendicular to the first side surface 2111 (e.g., the x-axis direction) and having a second length smaller than the first length, and a third side surface 2113 extending from the second side surface 2112 to be substantially parallel to the first side surface 2111 and having the first length. In an embodiment, the first side surface member 211 may be at least partially made of a conductive member (e.g., metal). In various embodiments, the first side surface member 211 may be configured by coupling a conductive member and a non-conductive member (e.g., polymer). In an embodiment, the first housing 210 may include a first extension member 212 extending from at least a portion of the first side surface member 211 to at least a portion of the first space 2101. In an embodiment, the first extension member 212 may be configured integrally with the first side surface member 211. In various embodiments, the first extension member 212 may be configured separately from the first side surface member 211 and may be structurally coupled to the first side surface member 211.

According to various embodiments, the second side surface member 221 may include a fourth side surface 2211 at least partially corresponding to the first surface 2111 and having a third length, a fifth side surface 2212 extending from the fourth side surface 2211 in a direction substantially parallel to the second side surface 2112 and having a fourth length greater than the third length, and a sixth side surface 2213 extending from the fifth side surface 2212 to correspond to the third side surface 2113 and having the third length. In an embodiment, the second side surface member 221 may be at least partially made of a conductive member (e.g., metal). In various embodiments, the second side surface member 221 may be configured by combining a conductive member and a non-conductive member (e.g., polymer). In an embodiment, at least a portion of the second side surface member 221 may include a second extension member 222 extending to at least a portion of the second space 2201 in the second housing 220. In an embodiment, the second extension member 222 may be configured integrally with the second side surface member 221. In various embodiments, the second extension member 222 may be configured separately from the second side surface member 221 and may be structurally coupled to the second side surface member 221.

According to various embodiments, the first side surface 2111 and the fourth side surface 2211 may be slidably coupled to each other. In various embodiments, the third side surface 2113 and the sixth side surface 2213 may be slidably coupled to each other. In various embodiments, in the slide-in state, the fourth side surface 2211 may be disposed to be substantially invisible from the outside by overlapping the first side surface 2111. In various embodiments, in the slide-in state, the sixth side surface 2213 may be disposed to be substantially invisible from the outside by overlapping the third side surface 2113. In various embodiments, at least a portion of the fourth and sixth side surfaces 2211 and 2213 may be disposed to be at least partially visible from the outside in the slide-in state. In various embodiments, in the slide-in state, the second extension member 222 may be disposed to be substantially invisible from the outside by overlapping the first extension member 212. In various embodiments, the second extension member 222 may be disposed to be at least partially visible from the outside in the slide-in state.

According to various embodiments, the first housing 210 may include a first rear surface cover 213 coupled to at least a portion of the first side surface member 211. In an embodiment, the first rear surface cover 213 may be disposed by being coupled to at least a portion of the first extension member 212. In various embodiments, the first rear surface cover 213 may be configured integrally with the first side surface member 211. In an embodiment, the first rear surface cover 213 may be made of polymer, coated or tinted glass, ceramic, metal (e.g., aluminum, stainless steel (STS), or magnesium), or a combination of at least two of these materials. In various embodiments, the first rear surface cover 213 may extend to at least a portion of the first side surface member 211. In various embodiments, the first rear surface cover 213 may be omitted, and at least a portion of the first extension member 212 may be replaced with the first rear surface cover 213.

According to various embodiments, the second housing 220 may include a second rear surface cover 223 coupled to at least a portion of the second side surface member 221. In an embodiment, the second rear surface cover 223 may be disposed by being coupled to at least a portion of the second extension member 222. In various embodiments, the second rear surface cover 223 may be configured integrally with the second side surface member 221. In an embodiment, the second rear surface cover 223 may be made of or include polymer, coated or tinted glass, ceramic, metal (e.g., aluminum, stainless steel (STS), or magnesium), or a combination of at least two of these materials. In various embodiments, the second rear surface cover 223 may extend to at least a portion of the second side surface member 221. In various embodiments, the second rear surface cover 223 may be omitted, and at least a portion of the second extension member 222 may be replaced with the second rear surface cover 223.

According to various embodiments, the flexible display 230 may include a first portion 230a (e.g., a flat portion) that is always visible from the outside, and a second portion 230b (e.g., a bendable portion or a bending portion) that extends from the first portion 230a and is at least partially bent and accommodated into the first space 2101 of the first housing 210 to be invisible from the outside in the slide-in state. In an embodiment, the first portion 230a may be disposed to be supported by the second housing 220, and the second portion 230b may be disposed to be at least partially supported by a support member (e.g., the support member 240 in FIG. 4). In an embodiment, in a state in which the second housing 220 is slid out along the first direction (direction ①), the second portion 230b of the flexible display 230 may define substantially the same plane as the first portion 230a while being supported by the support member (e.g., the support member 240 in FIG. 4), and may be disposed to be visible from the outside. In an embodiment, in a state in which the second housing 220 is slid in along the second direction (direction ②), the second portion 230b of the flexible display 230 may be disposed to be bent and accommodated into the first space 2101 of the first housing 210 and to be invisible from the outside. Accordingly, in the flexible display 230, the display area may be variable since the second housing 220 is moved in a sliding manner from the first housing 210 in a predetermined direction (e.g., the ±y-axis direction).

According to various embodiments, the flexible display 230 may be variable in length in the first direction (direction ①) depending on the sliding of the second housing 220 that is moved with respect to the first housing 210. For example, in the slide-in state, the flexible display 230 may have a first display area corresponding to a first length L1 (e.g., an area corresponding to the first portion 230a). In an embodiment, in the slide-out state, depending on the sliding of the second housing 220 further moved by a second length L2 with respect to the first housing 210, the flexible display 230 may be expanded to have a second display area (e.g., an area including the first portion 230a and the second portion 230b), which corresponds to a third length L3 greater than the first length L1 and is larger than the first display area.

According to various embodiments, the electronic device 200 may include at least one of an input device (e.g., a microphone 203-1) disposed in the second space 2201 of the second housing 220, a sound output device (e.g., a phone call receiver 206 and/or a speaker 207), sensor modules 204 and 217, a camera module (e.g., the first camera module 205 or the second camera module 216), a connector port 208, a key input device 219, or an indicator (not illustrated). In an embodiment, the electronic device 200 may include another input device (e.g., the microphone 203) disposed in the first housing 210. In various embodiments, the electronic device 200 may be configured such that at least one of the above-mentioned components is omitted or other components are additionally included. In various embodiments, at least one of the above-described components may be disposed in the first space 2101 in the first housing 210.

According to various embodiments, the input device may include a microphone 203-1. In various embodiments, the input device (e.g., the microphone 203-1) may include a plurality of microphones arranged to detect the direction of sound. The sound output device may include, for example, a call receiver 206 and a speaker 207. In an embodiment, regardless of the slide-in/slid-out state, the speaker 207 may face the outside through at least one speaker hole provided in the second housing 220 at a position always exposed to the outside (e.g., the fifth side surface 2212). In an embodiment, in the slide-out state, the connector port 208 may face the outside through a connector port hole provided in the second housing 220. In various embodiments, in the slide-in state, the connector port 208 may face the outside through an opening provided in the first housing 210 to correspond to the connector port hole. In various embodiments, the call receiver 206 may include a speaker that is operated without a separate speaker hole (e.g., a piezo speaker).

According to various embodiments, the sensor modules 204 and 217 may generate electrical signals or data values corresponding to the internal operating state of the electronic device 200 or an external environmental state. In an embodiment, the sensor modules 204 and 217 may include, for example, a first sensor module 204 (e.g., a proximity sensor or an illuminance sensor) disposed on the front surface of the electronic device 200 and/or a second sensor module 217 (e.g., a heart rate monitoring (HRM) sensor) disposed on the rear surface of the electronic device 200. In an embodiment, the first sensor module 204 may be disposed under the flexible display 230 in the front surface of the electronic device 200. In an embodiment, the first sensor module 204 and/or the second sensor module 217 may include at least one of a proximity sensor, an illuminance sensor, a time-of-flight (TOF) sensor, an ultrasonic sensor, a fingerprint recognition sensor, a gesture sensor, a gyro sensor, an atmospheric pressure sensor, a magnetic sensor, an acceleration sensor, a grip sensor, a color sensor, an infrared (IR) sensor, a biometric sensor, a temperature sensor, or a humidity sensor.

According to various embodiments, the camera module may include a first camera module 205 disposed on the front surface of the electronic device 200 and a second camera module 216 disposed on the rear surface of the electronic device 200. In an embodiment, the electronic device 200 may include a flash (not illustrated) located near the second camera module 216. In an embodiment, the camera modules 205 and 216 may include one or more lenses, an image sensor, and/or an image signal processor. In an embodiment, the first camera module 205 may be disposed under the flexible display 230 and may be configured to photograph a subject through a portion of an active area (e.g., a display area) of the flexible display 230.

According to various embodiments, the first camera module 205 among the camera modules and some sensor modules 204 among the sensor modules 204 and 217 may be disposed to detect the external environment through the flexible display 230. For example, the first camera module 205 or some sensor modules 204 may be disposed in the second space 2201 in the first housing 220 to be in contact with the external environment through a transmission area or a perforated opening provided in the flexible display 230. In an embodiment, the area of the display 230 that faces the first camera module 205 may be configured as the transmission area having a predetermined transmittance, as a portion of an active area that displays content. In an embodiment, the transmission area may have a transmittance ranging from about 5% to about 20%. The transmission area may include an area overlapping an effective area (e.g., a field of view area) of the first camera module 205 through which light imaged by an image sensor to generate an image passes. For example, the transmission area of the flexible display 230 may include an area having a lower pixel arrangement density and/or a lower wiring density than the surrounding area. For example, the transmission area may be replaced with the above-mentioned opening. For example, various camera modules 205 may include an under-display camera (UDC). In various embodiments, some sensor modules 204 may be disposed to perform the functions thereof in the second space 2201 in the second housing 220 without being visually exposed through the flexible display 230.

According to various embodiments, the electronic device 200 may include at least one antenna element (e.g., the antenna element 224b in FIG. 4) electrically connected to a wireless communication circuit (e.g., the wireless communication module 192 in FIG. 1) disposed in an inner space (e.g., the second space 2201 in second housing 220). In an embodiment, the electronic device 200 may include a bezel antenna A disposed through at least a portion of the conductive first side surface member 211 of the first housing 210. For example, the bezel antenna A may include a conductive portion 227 disposed through at least a portion of the second and third side surfaces 2112 and 2113 of the first side surface member 211 and electrically split by one or more split portions 2271 and 2272 made of a non-conductive material (e.g., polymer). In an embodiment, the wireless communication circuit (e.g., the wireless communication module 192 in FIG. 1) may be configured to transmit or receive a wireless signal in at least one predetermined frequency band (e.g., about 600 MHz to 9000 MHz) (e.g., a legacy band or NR band) via the conductive portion 227. In an embodiment, the electronic device 200 may include a side surface cover 2112a disposed on the second side surface 2112 to cover at least a portion of the at least one splitting portion 2271. In various embodiments, the bezel antenna A may be disposed on at least one of the first side surface 2111, the second side surface 2112, or the third side surface 2113. In various embodiments, the bezel antenna A may be disposed on at least one of the fourth side surface 2211, the fifth side surface 2212, or the sixth side surface 2213 of the second housing 220. In various embodiments, the electronic device 200 may further include at least one antenna module (e.g., a mmWave antenna module or a mmWave antenna structure) disposed in the inner space (e.g., the first space 2101 or the second space 2201) and configured to transmit or receive a wireless signal of a frequency band ranging from about 3 GHz to 100 GHz via another wireless communication circuit (e.g., the wireless communication module 192 in FIG. 1).

According to various embodiments, the slide-in/slide-out operation of the electronic device 200 may be automatically performed. For example, the slide-in/slide-out operation of the electronic device 200 may be executed via gear-coupling between a drive motor (e.g., the drive motor 260 in FIG. 4) including a pinion gear (e.g., the pinion gear 261 in FIG. 4) disposed in the first space 2101 in the first housing 210 and a rack gear (e.g., the rack gear 228 in FIG. 4) disposed in the second space 2201 in the second housing 220 and gear-coupled with the pinion gear 261. In various embodiments, the drive motor 260 including the pinion gear 261 may be disposed in the second space 2201 in the second housing 220, and the rack gear 228 coupled with the pinion gear 261 may be disposed in the first space 2101 in the first housing 210. For example, when detecting a triggering signal of switching from the slide-in state to the slide-out state or from the slide-out state to the slide-in state, the processor (e.g., the processor 120 in FIG. 1) of the electronic device 200 may operate the drive motor (e.g., the drive motor 260 in FIG. 4) disposed inside the electronic device 200. In an embodiment, the triggering signal may include a signal generated in response to selection (e.g., touch) of an object displayed on the flexible display 230 or manipulation of a physical button (e.g., a key button) included in the electronic device 200. In various embodiments, the slide-in/slide-out operation of the electronic device 200 may be manually performed through a user's manipulation.

According to various embodiments, the electronic device 200 has a structure in which the second housing 220 is slid in and/or slid out with respect to the first housing 210 along the length direction of the electronic device 200 (e.g., a vertical direction) (e.g., the ±y-axis direction), but is not limited thereto. For example, the electronic device 200 may have a structure in which the second housing 220 is slid in or slid out with respect to the first housing 210 along the width direction of the electronic device 200 perpendicular to the length direction (e.g., a horizontal direction) (e.g., the ±x-axis direction). In various embodiments, the electronic device 200 may be configured such that the length of the second side surface 2112 of the first housing 210 is greater than the length of the first side surface 2111. In this case, correspondingly, the length of the fifth side surface 2212 of the second housing 220 may also be greater than the length of the fourth side surface 2211.

FIG. 4 is an exploded perspective view of an example electronic device according to various embodiments of the disclosure.

In describing the electronic device 200 of FIG. 4, the same reference numerals are assigned to substantially the same components as those of the electronic device 200 of FIGS. 2A, 2B, 3A, and 3B, and a detailed description thereof may not be repeated.

Referring to FIG. 4, the electronic device 200 may include a first housing 210 including a first space 2101, a second housing 220 coupled to be slidable from the first housing 210 and including a second space 2201, a support member 240 fixed to at least a portion of the second housing 220 and accommodated into the first space 2101 to be at least partially bendable according to a slide-in operation, a flexible display 230 disposed to be supported by at least a portion of the support member 240 and the second housing 220, and a drive module (e.g., a drive mechanism) that drives the second housing 220 in a slide-in direction (e.g., the −y axis direction) and/or a slide-out direction (e.g., the y-axis direction) from the first housing 210. In an embodiment, the first housing 210 may include a first side surface member 211 and a first rear surface cover 213 coupled with at least a portion of the first side surface member 211 (e.g., at least a portion of the first extension member 212). In an embodiment, the second housing 220 may include a second side surface member 221 and a second rear surface cover 223 coupled with at least a portion of the second side surface member 221 (e.g., at least a portion of the second extension member 222). In an embodiment, the driving module may include a drive motor 260 disposed in the first space 2101 and including a pinion gear 261 and a rack gear 228 disposed in the second space 2201 to be gear-coupled with the pinion gear 261. In an embodiment, the drive module may further include a reduction module (e.g., a reduction gear assembly) disposed to reduce rotational speed and increase driving force by being coupled with the drive motor 260. In an embodiment, the drive motor 260 may be disposed to be supported by a motor bracket 260a disposed on a support bracket 225 disposed in the first space 2101 in the first housing 210. In an embodiment, the drive motor 260 may be fixed to an end (e.g., an edge) of the support bracket 225 in the slide-out direction (e.g., the y-axis direction) in the first space 2101. In an embodiment, the rack gear 228 may be disposed on the second extension member 222 of the second housing 220. In an embodiment, the rack gear 228 may be arranged to have a length in a direction parallel to the sliding direction (e.g., the ±y-axis direction). Therefore, when the electronic device 200 is assembled, the pinion gear 261 may maintain the state of being gear-coupled with the rack gear 228, and the pinion gear 261 receiving the driving force of the drive motor 260 is moved along the rack gear 228. As a result, the second housing 220 can be moved with respect to the first housing 210. In an embodiment, the sliding distance of the second housing 220 may be determined by the length of the rack gear 228.

According to various embodiments, the electronic device 200 may include multiple electronic components disposed in the second space 2201. In an embodiment, the multiple electronic components may include a first circuit board 251 (e.g., a main circuit board), a camera module 216 disposed around the first circuit board 251, a speaker 207, a connector port 208, and a microphone 203-1. In an embodiment, since the multiple electronic components are disposed around the first circuit board 251 in the second space 2201 in the first housing 210, efficient electrical connection may be possible. In various embodiments, at least one of the above-described multiple electronic components may be disposed in the first space 2101 in the first housing 210.

According to various embodiments, the electronic device 200 may include a rear bracket 224 disposed between the second extension member 222 and the second rear surface cover 223 in second housing 220. In an embodiment, the rear bracket 224 may be disposed to cover at least some of the multiple electronic components. In an embodiment, the rear bracket 224 may be structurally coupled to at least a portion of the second extension member 222. In various embodiments, the rear bracket 224 may be omitted. In an embodiment, the rear bracket 224 may be disposed to cover the multiple electronic components and to support the second rear surface cover 223. In an embodiment, the rear bracket 224 may include an opening 224a (e.g., a through hole) or a notch area 224c (e.g., a cut portion) provided in an area corresponding to a camera module 216 and/or a sensor module (e.g., the sensor module 217 in FIG. 3B). In an embodiment, the rear bracket 224 may include at least one antenna element 224b. In an embodiment, when the rear bracket 224 is a dielectric injection-molded product (e.g., an antenna carrier), the at least one antenna element 224b may be disposed on the outer surface of the rear bracket 224. In an embodiment, the at least one antenna element 224b may include a laser direct structuring (LDS) antenna pattern provided on the outer surface of the rear bracket 224. In various embodiments, the at least one antenna element 224b may include a conductive plate attached to the outer surface of the rear bracket 224 or a conductive paint or conductive pattern provided on the outer surface. In various embodiments, the at least one antenna element 224b may be disposed in a built-in manner when the rear bracket 224 is injection-molded. In an embodiment, the at least one antenna element 224b may be configured to transmit or receive a wireless signal in a predetermined frequency band (e.g., a legacy band) by being electrically connected to a wireless communication circuit (e.g., the wireless communication module 192 in FIG. 1) disposed on the first circuit board 251. In an embodiment, the camera module 216 and/or the sensor module 217 may be arranged to detect an external environment through the opening 224a or the notch area 224c. In an embodiment, the second rear surface cover 223 may be processed to be transparent at least in an area corresponding to the camera module 216 and/or the sensor module 217. In various embodiments, the second rear surface cover 223 may include a through hole provided at least the area corresponding to the camera module 216 and/or the sensor module 217. In this case, the through hole may be covered with a transparent window. In various embodiments, the camera module 216 and/or the sensor module 217 may be configured to operate only when the electronic device 200 is in the slide-out state.

According to various embodiments, the electronic device 200 may include a support bracket 225 disposed in the first space 2101 in the first housing 210. In an embodiment, the support bracket 225 may include a support portion 2252 disposed at one end thereof, wherein the support portion 2252 has a curved outer surface to support the rear surface of the support member 240 that is bent during a sliding operation for switching from the slide-out state to the slide-in state. In an embodiment, the support bracket 225 may include a support structure configured to support and fix the drive motor 260 via the motor bracket 260a. In an embodiment, the support bracket 225 may include a battery seat 2251 configured to accommodate a battery. In an embodiment, the drive motor 260 may be disposed at the end (e.g., an edge) of the support bracket 225 in the slide-out direction (e.g., the y-axis direction). For example, when the assembly of the electronic device 200 is completed, the drive motor 260 may be disposed at a position closest to the first circuit board 251 among the electronic components disposed in the first housing 210, thereby helping to minimize the size and/or the length of the flexible circuit board F1 (e.g., a flexible printed circuit board (FPCB)) electrically interconnecting the first circuit board 251 and the drive motor 260. In an embodiment, the electronic device 200 may include a pair of guide rails 226 disposed on opposite side surfaces of the support bracket 225 to guide the opposite ends of the support member 240 in the sliding direction.

According to various embodiments, the first housing 210 may include an opening 212a (e.g., a through hole) disposed in an area corresponding to the camera module 216 and/or the sensor module 217 disposed in the second housing 220 when the electronic device 200 is in the slide-in state in the first extension member 212. In an embodiment, when the electronic device 200 is in the slide-in state, the camera module 216 and/or the sensor module 217 may detect an external environment through the opening 212a provided in the first housing 210. In various embodiments, an area of the first rear surface cover 213 corresponding to the camera module 216 and/or the sensor module 217 may be processed to be transparent.

According to various embodiments, the electronic device 200 may include a second circuit board 252 (e.g., a sub-circuit board) and an antenna member 253 disposed between the first extension member 212 and the first rear surface cover 213 in the first housing 210. In an embodiment, the second circuit board 252 and the antenna member 253 may be disposed on at least a portion of the first extension member 212. In an embodiment, the second circuit board 252 and the antenna member 253 may be electrically connected to the first circuit board 251 via at least one electrical connection member (e.g., a flexible printed circuit board (FPCB) or a flexible RF cable (FRC)). In an embodiment, the antenna member 253 may include a multi-function coil or multi-function core (MFC) antenna configured to execute a wireless charging function, a near field communication (NFC) function, and/or an electronic payment function. In various embodiments, the antenna member 253 may be electrically connected to the first circuit board 251 via the second circuit board 252 by being electrically connected to the second circuit board 252. In various embodiments, the second circuit board 252 and/or the antenna member 253 may be electrically connected to the second circuit board 251 via at least a portion of the flexible circuit board F1 connecting the drive motor 260 and the first circuit board 251 to each other.

According to various embodiments, the support member 240 may be guided by the guide rails 226 during the slide-in/slide-out operation. In an embodiment, the support member 240 may include multiple bars 241 rotatably coupled to each other and a guide projection 2411 protruding from each of opposite ends of each of the multiple bars 241. In an embodiment, the guide rails 226 may each include a guide slit 2261 provided at a position corresponding to a movement trajectory of the support member 240. In an embodiment, when the support member 240 fixed by being attached to the rear surface of the flexible display 230 is movably coupled to the guide rails 226, the guide projections 2411 may move along the guide slits 2261, thereby helping to reduce a phenomenon in which the flexible display 230 is separated or deformed during operation.

According to various embodiments, the rack gear 228 may be disposed to be movable by a predetermined reciprocating distance in the sliding direction of the second housing 220 (e.g., the ±y-axis direction). In an embodiment, the electronic device 200 may include a stopper assembly 300 disposed on the support bracket 225 of the first housing 210 and disposed to at least partially receive interference according to the movement of the rack gear 228. In an embodiment, the stopper assembly 300 may perform a locking function for maintaining the slide-out state by being at least partially fastened to the first housing 210 by being at least partially interfered with the rack gear 228 in a state in which the second housing 220 is completely slid out. The locking function of the stopper assembly 300 reduces a phenomenon in which the second housing 220 is forcibly moved by an external impact such as a drop in the slide-out state, thereby helping to reduce the damage of the pinion gear 261 and the rack gear 228, which are gear-coupled with each other.

Figure 5A:
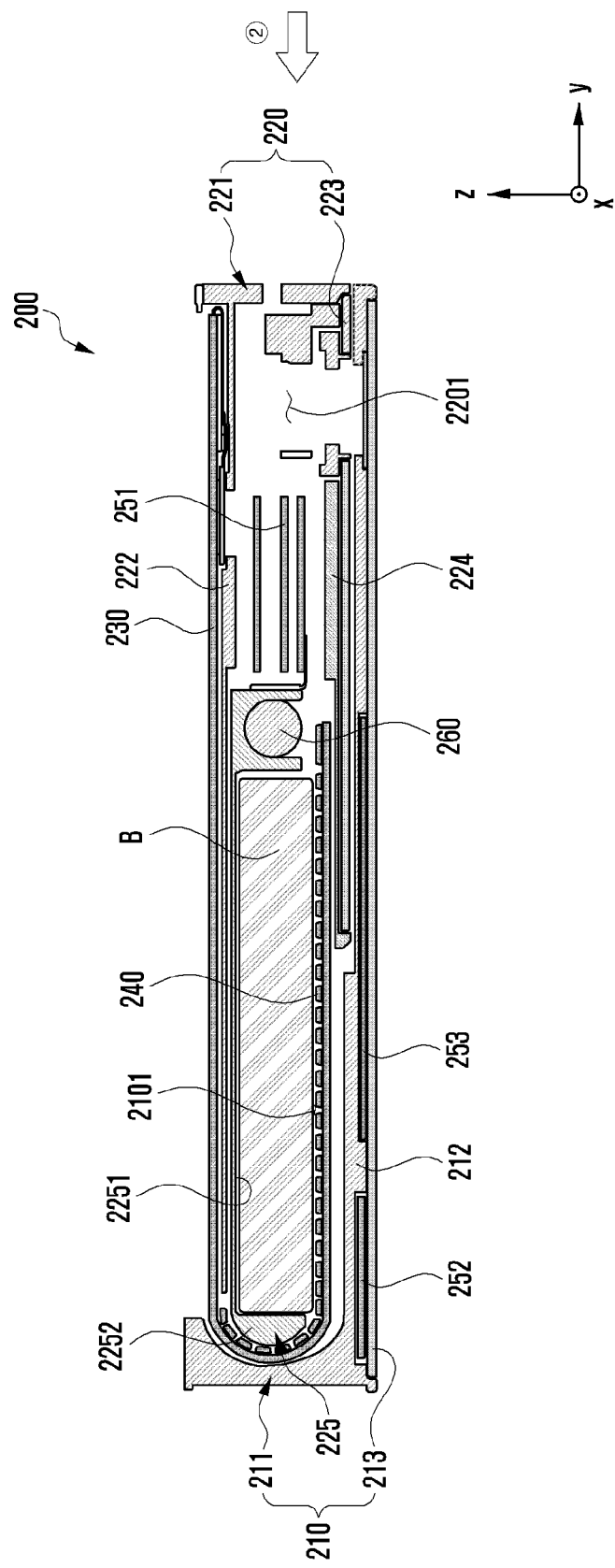
FIG. 5A is a cross-sectional view of an example electronic device taken along line 5a-5a in FIG. 2A according to various embodiments.
Figure 5B:
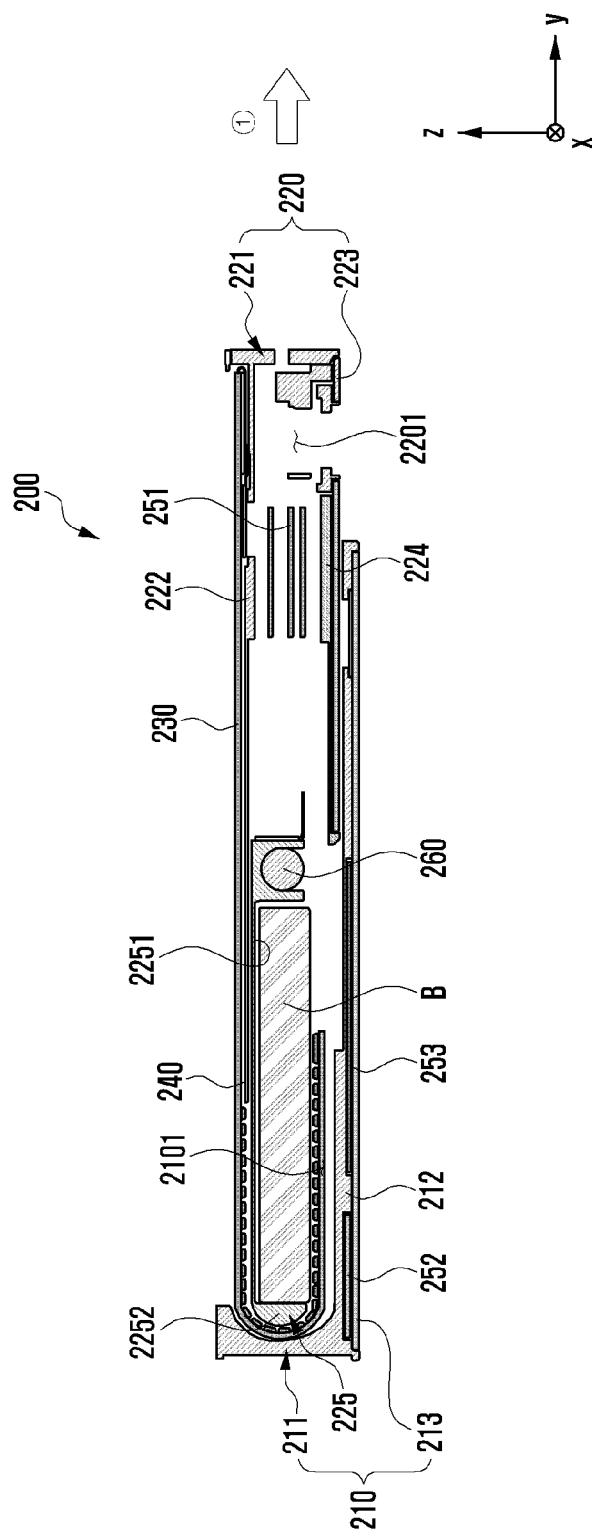
FIG. 5B is a cross-sectional view illustrating an example electronic device in an intermediate state according to various embodiments.
Figure 5C:
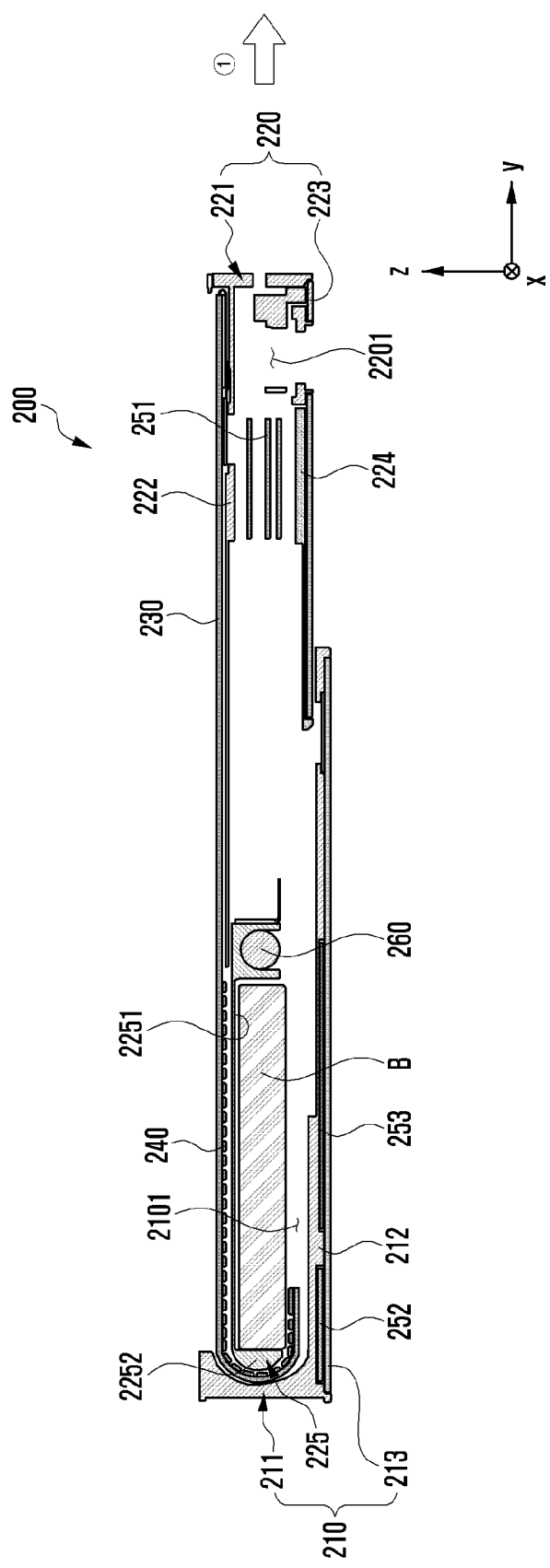
FIG. 5C is a cross-sectional view of an example electronic device taken along line 5c-5c in FIG. 3A according to various embodiments.

FIG. 5A is a cross-sectional view of an example electronic device taken along line 5a-5a in FIG. 2A according to various embodiments of the disclosure. FIG. 5B is a cross-sectional view illustrating an example electronic device in an intermediate state according to various embodiments of the disclosure. FIG. 5C is a cross-sectional view of an example electronic device taken along line 5c-5c in FIG. 3A according to various embodiments of the disclosure.

In describing the electronic device 200 of FIGS. 5A, 5B, and 5C, the same reference numerals are assigned to the same components as those of the electronic device 200 of FIG. 4, and a detailed description thereof may not be repeated.

Referring to FIGS. 5A, 5B, and 5C, the electronic device 200 may include a first housing 210 including a first space 2101, a second housing 220 including a second space 2201, a support member 240 connected to the second housing 220 and at least partially accommodated in the first space 2101 in the slide-in state, a flexible display 230 disposed to be supported by at least a portion of the support member 240 and at least a portion of the second housing 220, and a drive motor 260 including a pinion gear (e.g., the pinion gear 261 in FIG. 4) disposed in the first space 2101 and gear-coupled with a rack gear (e.g., the rack gear 228 in FIG. 4) in the second space 2201. In an embodiment, via the gear-coupling between the pinion gear (e.g., the pinion gear 261 in FIG. 4) and the rack gear 2121 (e.g., the rack gear 228 in FIG. 4), the drive motor 260 may automatically move the second housing 220 in the slide-in direction (direction ②) or the slide-out direction (direction ①) with respect to the first housing 210.

According to various embodiments, in the slide-in state of the electronic device 200 (the state in FIG. 5A), at least a portion of the second housing 220 may be accommodated in the first space 2101 in the first housing 210. In an embodiment, at least a portion of the flexible display 230 may be disposed to be invisible from the outside by being bent and accommodated into the first space 2101 together with the support member 240. In this case, a first display area of the flexible display 230 (e.g., the display area corresponding to the first portion 230a in FIG. 3A) may be exposed to the outside.

According to various embodiments, the electronic device 200 may be switched from an intermediate state (the state illustrated in FIG. 5B) to the slide-out state (the state illustrated in FIG. 5C) by controlling driving of the drive motor 260. In various embodiments, the electronic device 200 may be configured to stop in a predetermined intermediate state between the slide-in state and the slide-out state (a free stop function). In various embodiments, the electronic device 200 may be switched to the slide-in state, the intermediate state, or the slide-out state through a user's manipulation in a state in which no driving force is provided to the drive motor 260.

According to various embodiments, at least a portion of the second housing 220 may be switched to the slide-out state of being at least partially moved to the outside from the first housing 210 along a first direction (direction ①) through the driving of the drive motor 260. In an embodiment, the flexible display 230 may be disposed such that the portion slid in the first space 2101 may be exposed to be visible from the outside by being moved together with the support member 240 while being supported by the support bracket 225 in the slide-out state of the electronic device 200

(the state of FIG. 5C). In this case, in the flexible display 230, a second display area (e.g., a display area including the first portion 230a and the second portion 230b in FIG. 3A) that is larger than the first display area may be exposed to the outside.

According to various embodiments, the electronic device 200 may include a battery B disposed in a battery seat 2251 of a support bracket 225 fixed to the first space 2101 in the first housing 210. In an embodiment, since the battery B is disposed in the first housing 210, a separate drive gap for avoiding interference with surrounding structures according to movement may not be required. Accordingly, the battery B may be expanded in thickness to approach the battery seat 2251 of the support bracket 225 or to come into contact with the rear surface of the support member 240, so that the battery volume is relatively increased to support the moving support member 240, thereby helping to reduce sagging of the flexible display 230 and to improve operational reliability.

Figure 6A:
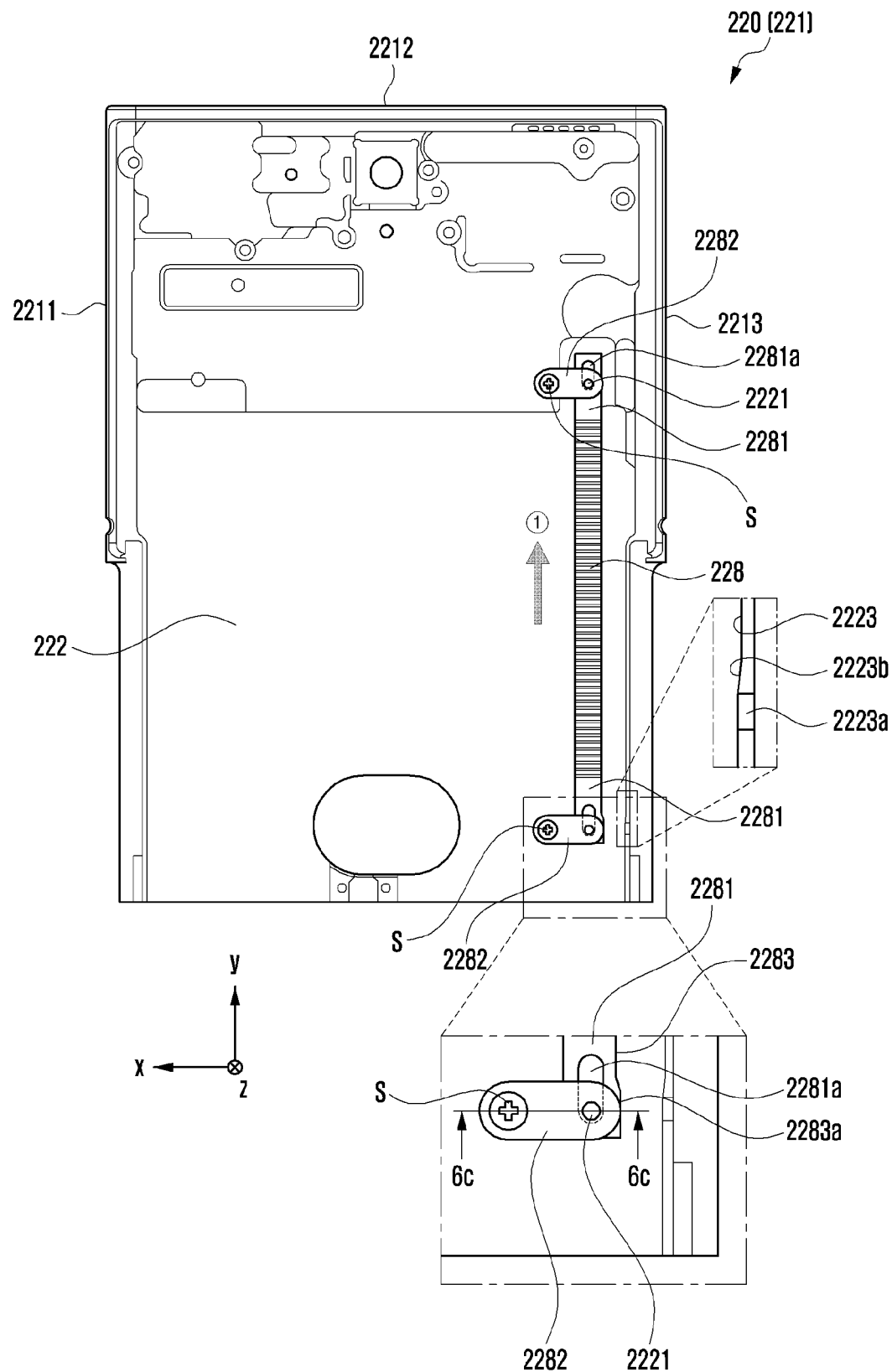
FIGS. 6A and 6B are views illustrating a configuration of an example second side surface member including a movably disposed rack gear according to various embodiments.
Figure 6B:
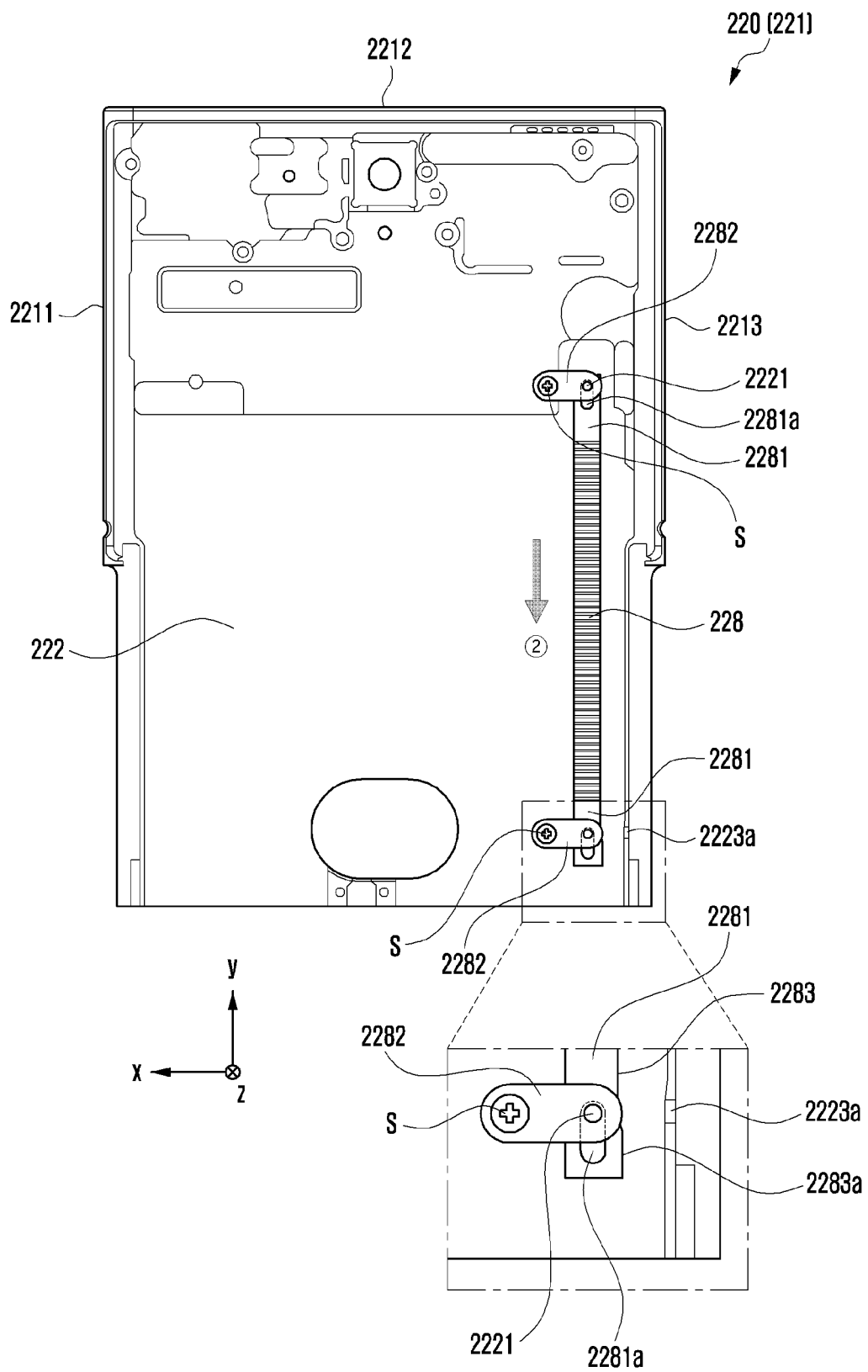
Figure 6C:
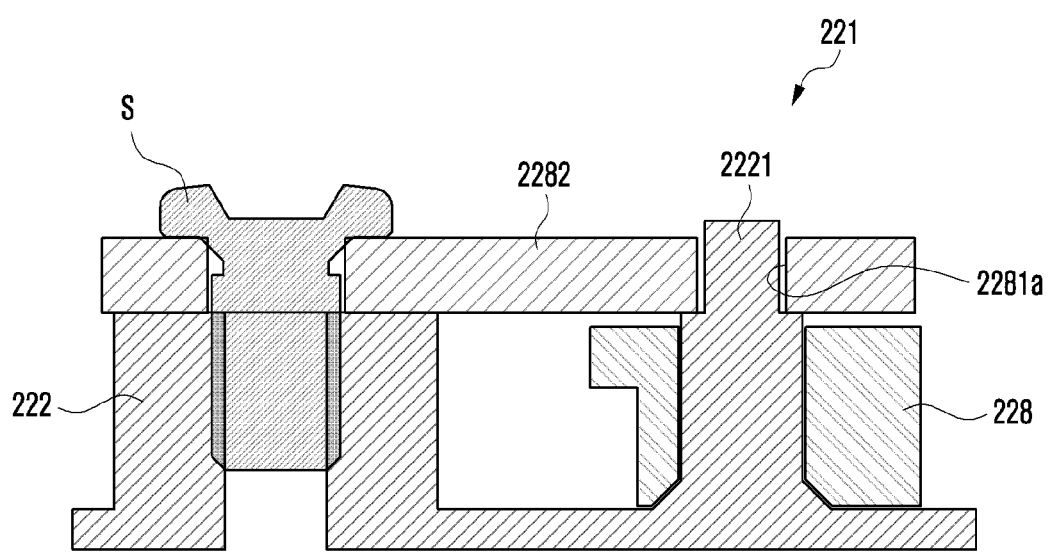
FIG. 6C is a partial cross-sectional view of an example second side surface member taken along line 6c-6c in FIG. 6A according to various embodiments.

FIGS. 6A and 6B are views illustrating the configuration of a second side surface member including a movably disposed rack gear according to various embodiments of the disclosure. FIG. 6C is a partial cross-sectional view of the second side surface member according to various embodiments of the disclosure taken along line 6c-6c in FIG. 6A.

Referring to FIGS. 6A, 6B, and 6C, an electronic device (e.g., the electronic device 200 in FIG. 4) may include a rack gear 228 disposed to be movable in a sliding direction in the second housing 220 (e.g., direction ① or direction ②) by a predetermined reciprocating distance. In an embodiment, the rack gear 228 may be movably disposed on at least a portion of the second extension member 222 extending from the second side surface member 221. In an embodiment, the rack gear 228 may include elongated holes 2281a having a length in the sliding direction (e.g., direction ① or direction ②) in the coupling portions 2281 at the opposite ends thereof where no teeth are provided. In an embodiment, the rack gear 228 may be temporarily assembled such that guide pins 2221 protruding from the second extension member 222 are inserted into the elongated holes 2281a in the coupling portions 2281. In an embodiment, the rack gear 228 may be coupled to the second housing 220 to be moved only in the sliding direction (e.g., direction ① or direction ②) by fixing brackets 2282, each of which has one end fixed to the second extension member 222 by a screw S and the other end that covers the top of a corresponding one of the guide pins 2221. Therefore, when the drive motor is rotated to switch the electronic device 200 from the slide-in state to the slide-out state, the rack gear 228 may be first moved in direction ① by the length of the elongated hole 2281a before the second housing 220 is moved, as illustrated in FIG. 6A. In contrast, when the drive motor is rotated to switch the electronic device 200 from the slide-out state to the slide-in state, the rack gear 228 may be first moved in direction ② by the length of the elongated hole 2281a before the second housing 220 is moved, as illustrated in FIG. 6B.

According to various embodiments, the rack gear 228 may include a side surface 2283, and may include a protrusion 2283a provided in at least a portion of the side surface corresponding to a coupling portion 2281 of the rack gear 228 and protruding outward. For example, the protrusions 2283a may protrude from the side surface 2283 of the rack gear 228 in a gradually tapered manner. For example, the protrusion 2283a may have a protruding amount that presses at least a portion of the stopper assembly (e.g., the stopper assembly 300 in FIG. 4) when the electronic device 200 enters the slide-out state.

According to various embodiments, the second housing 220 may include a side wall 2223 provided in at least a portion of the second side surface member 221 to face the rack gear 228 and a recess 2223a (e.g., fastening recess) recessed from the side wall 223. In an embodiment, the recess 2223a may be connected to an inclined portion 2223b that is tapered and inclined from the side wall 2223. In an embodiment, the inclined portion 2223b may be inclined such that the side wall 2223 is closer to the rack gear 228 toward the recess 2223a. For example, the side wall 2223 may support at least a portion of the stopper assembly 300 during the sliding motion of the electronic device 200. In an embodiment, the recess 2223a may perform an engagement function for accommodating at least a portion of the stopper assembly 300 disposed on the first housing 210 in the slide-out state of the electronic device 200. Accordingly, the stopper assembly 300 may help to maintain the slide-out state of the electronic device 200 such that the electronic device 200 is not deformed even when an external impact such as a drop is applied.

Figure 7A:
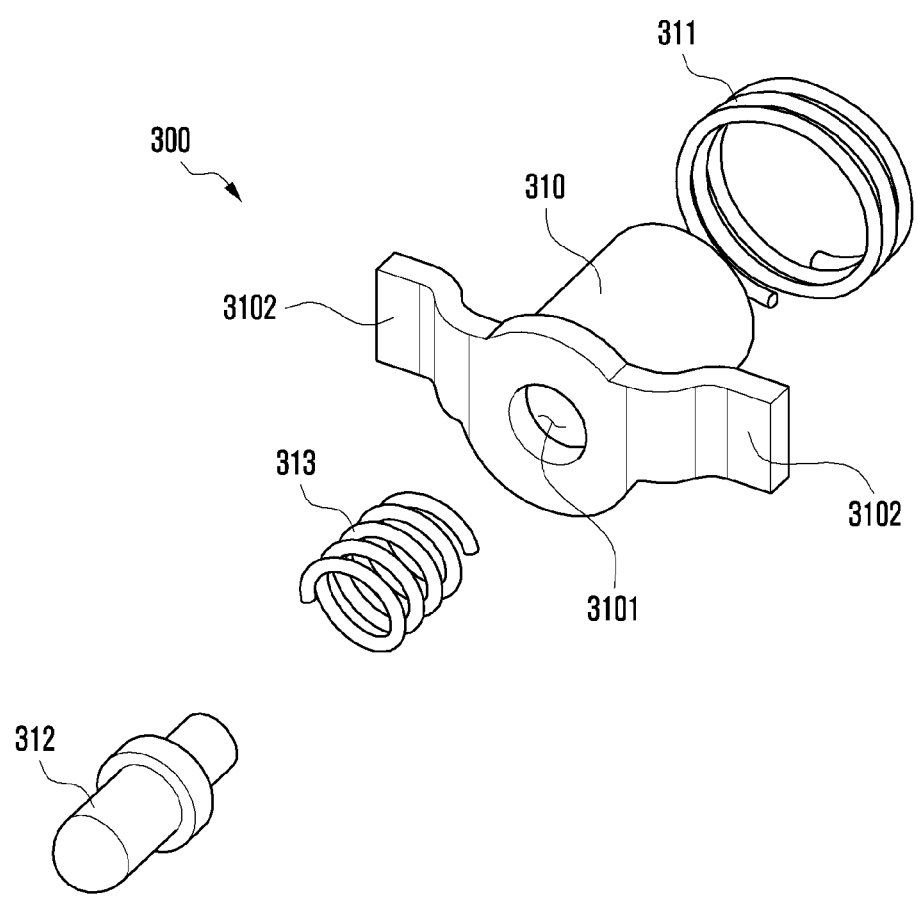
FIG. 7A is an exploded perspective view of an example stopper assembly according to various embodiments.
Figure 7B:
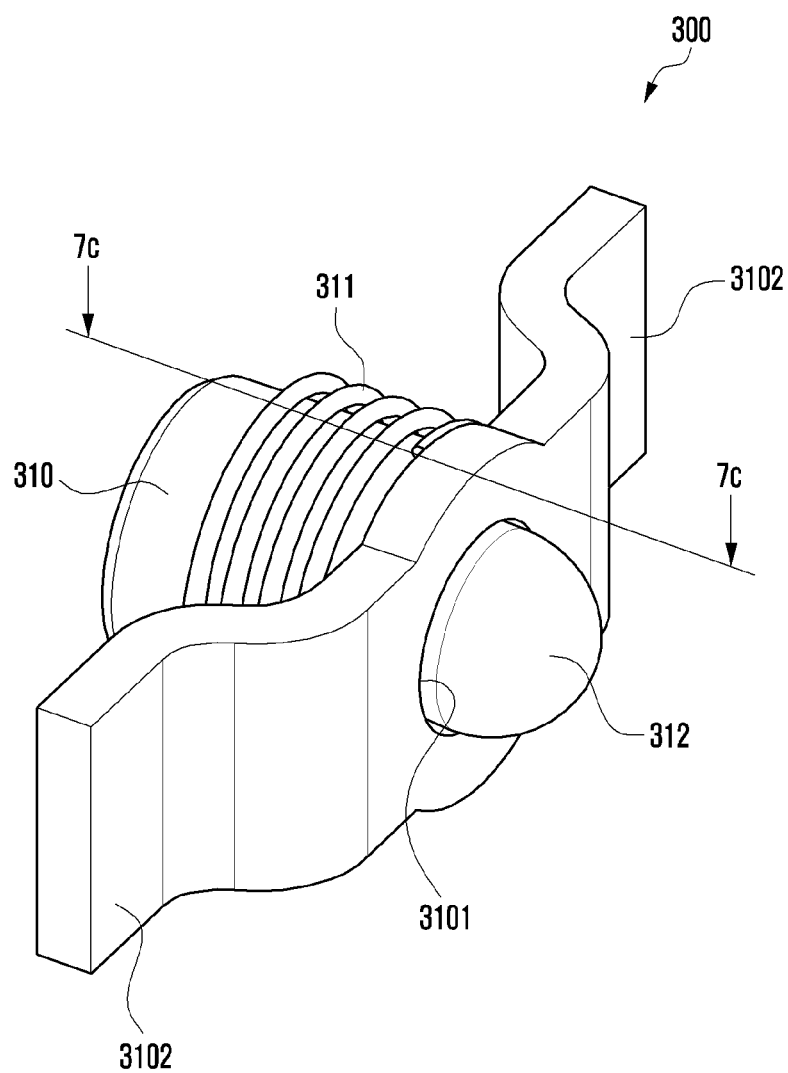
FIG. 7B is an assembled perspective view of an example stopper assembly according to various embodiments.
Figure 7C:
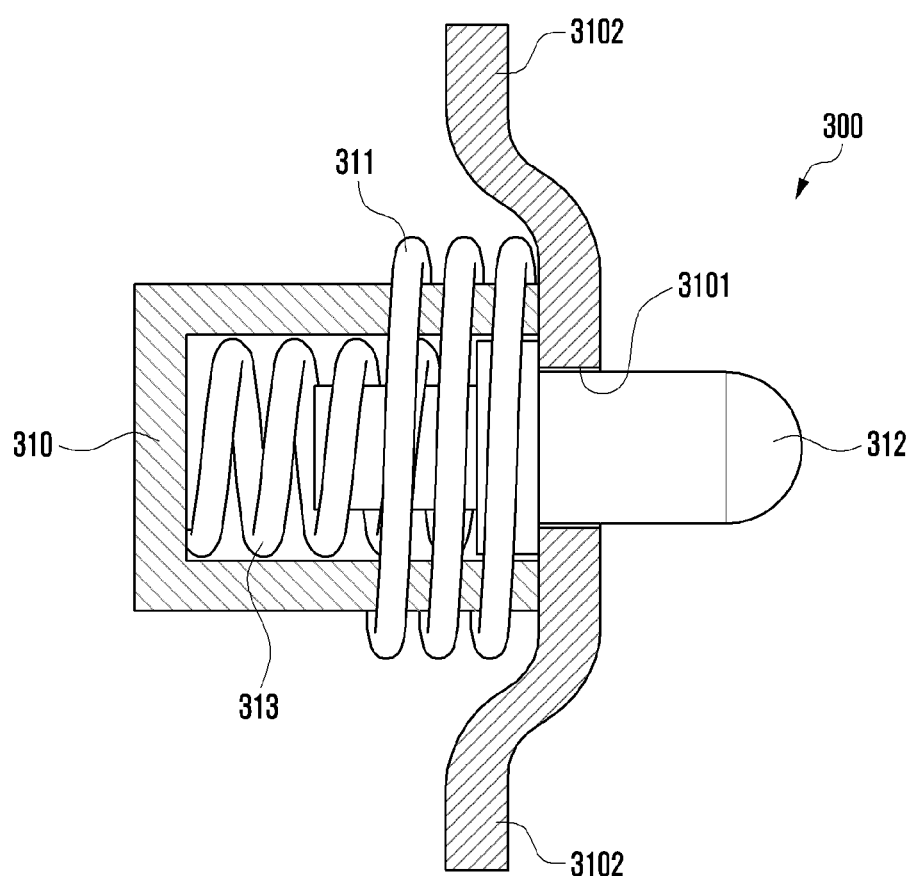
FIG. 7C is a cross-sectional view of an example stopper assembly taken along line 7c-7c in FIG. 7B according to various embodiments.

FIG. 7A is an exploded perspective view of an example stopper assembly according to various embodiments of the disclosure. FIG. 7B is an assembled perspective view of an example stopper assembly according to various embodiments of the disclosure. FIG. 7C is a cross-sectional view of an example stopper assembly according to various embodiments of the disclosure taken along line 7c-7c in FIG. 7B.

The stopper assembly 300 in FIGS. 7A, 7B, and 7C is substantially similar to the stopper assembly 300 in FIG. 4, or may further include other embodiments of the stopper assembly.

Referring to FIGS. 7A, 7B, and 7C, the stopper assembly 300 may include a stopper body 310 and a pressing member 312 elastically coupled to the stopper body 310. In an embodiment, the stopper body 310 may be of a cylinder type and may include a pressing member accommodation recess 3101. In an embodiment, the stopper body 310 may be elastically coupled via a first spring 311 to be supported by at least a portion of a support bracket (e.g., the support bracket 225 in FIG. 4) of the first housing (e.g., the first housing 210 in FIG. 4). In this case, the stopper body 310 may be supported by support pieces 3102 extending from the opposite ends thereof not to be separated from a stopper accommodation portion in the support bracket 220 (e.g., the stopper accommodation portion 2254 in FIG. 8B). In an embodiment, the pressing member 312 may be partially accommodated in an accommodation recess 3101 in the stopper body 310 not to be separated, and may be coupled to partially protrude to the outside of the stopper body 310 by a second spring 313. In this case, the first spring 311 and the second spring 313 may be disposed such that each of the springs presses the stopper body 310 and the pressing member 312 in the same direction. For example, the first spring 311 and the second spring 313 may include coil springs. In some embodiments, the first spring 311 and the second spring 313 may be replaced with leaf springs or elastic materials (e.g., rubber or silicone). In an embodiment, the end portion of the pressing member 312 may be configured in a curved shape since the end portion may come into contact with the side surface (e.g., the side surface 2283 in FIG. 6A) and/or the protrusion (e.g., the protrusion 2283a in FIG. 6A) of the rack gear (e.g., the rack gear 228 in FIG. 6A). In various embodiments, in order to reduce friction generated by the contact between the pressing member 312 and the side surface 2283 and/or the protrusion 2283a of the rack gear 228, the end portion of the pressing member 312, and/or the side surface 2283 and/or the protrusion 2283a of the rack gear 228 may include a friction reduction coating layer (e.g., a hard coating layer or a Teflon coating layer). In an embodiment, the pressing force of the second spring 313 pressing the pressing member 312 may be configured to be stronger than the pressing force of the first spring 311 pressing the stopper body 310. For example, when the pressing member 312 is retracted while being pressed by the second spring 313, the stopper body 310 supported by the first spring 311 having a weaker pressing force than the second spring 313 may also be retracted together with the pressing member 312. In an embodiment, the stopper body 310 and/or the pressing member 312 may be made of a metal material (e.g., SUS). In various embodiments, the stopper body 310 and/or the pressing member 312 may be made of a polymer material (e.g., PC).

Figure 8A:
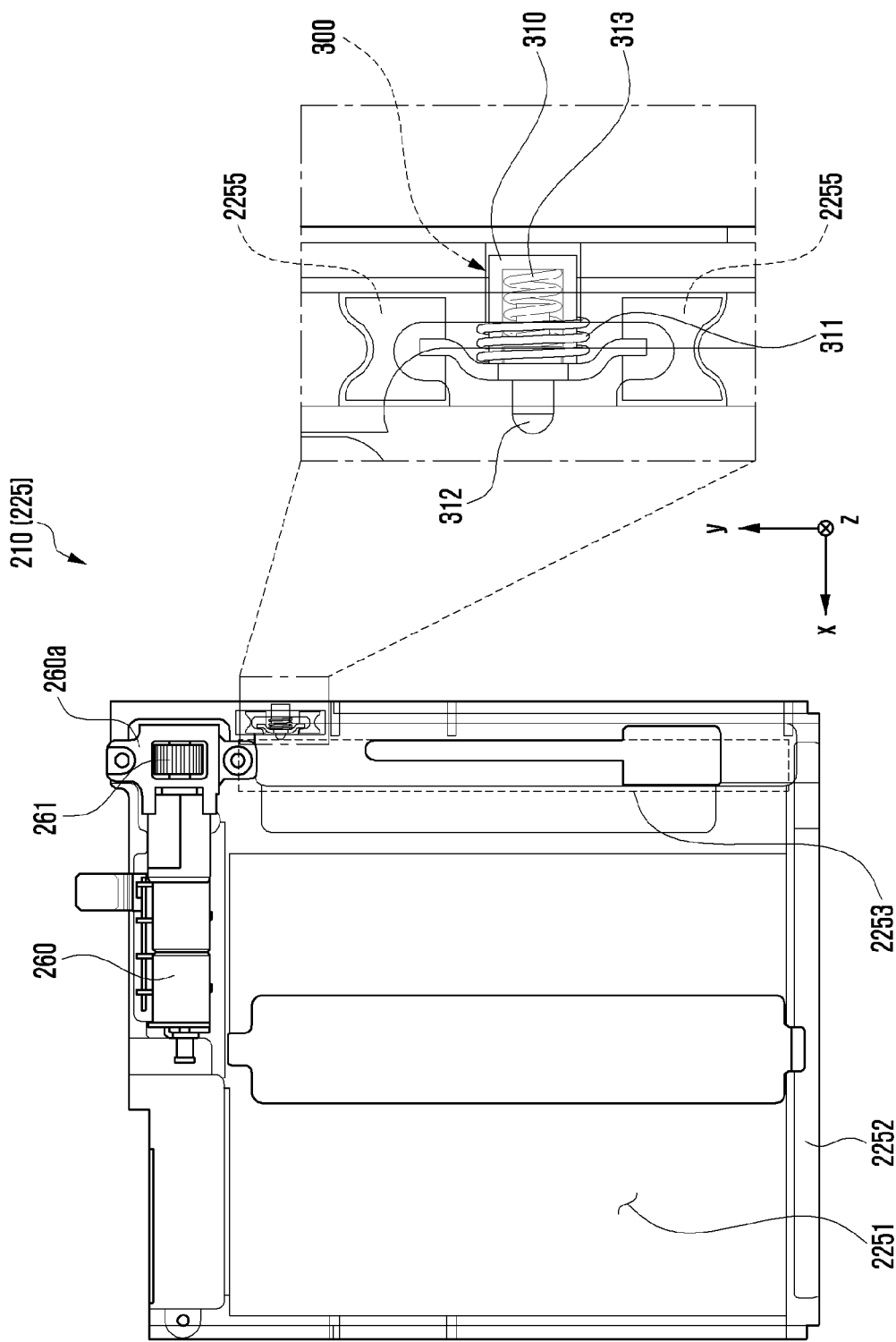
FIG. 8A is a configuration view of an example support bracket including a stopper assembly according to various embodiments.
Figure 8B:
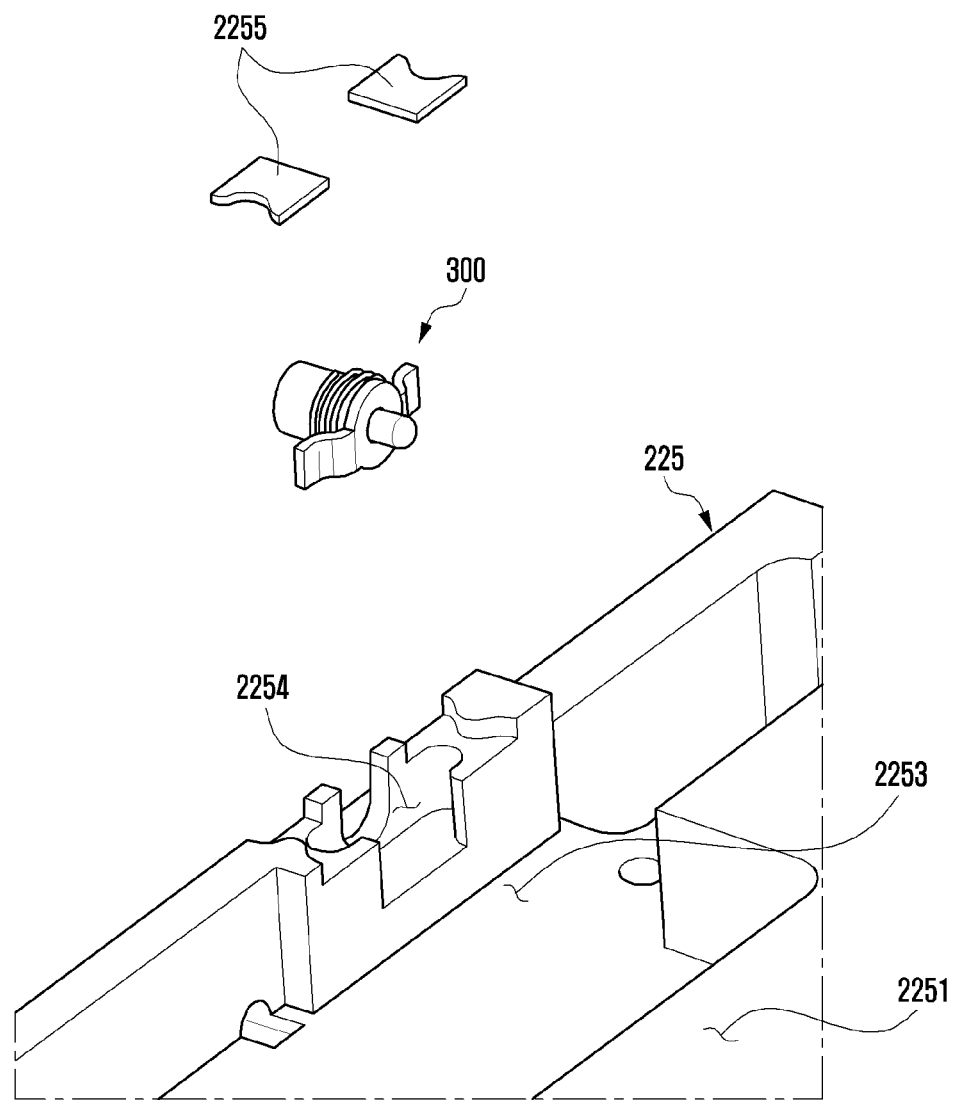
FIG. 8B is a partial perspective view of an example support bracket to which a stopper assembly is coupled according to various embodiments.

FIG. 8A is a configuration view of an example support bracket including an example stopper assembly according to various embodiments of the disclosure. FIG. 8B is a partial perspective view of an example support bracket to which the stopper assembly is coupled according to various embodiments of the disclosure.

Referring to FIGS. 8A and 8B, an electronic device (e.g., the electronic device 200 in FIG. 4) may include the stopper assembly 300 disposed on at least a portion of the first housing 210. In an embodiment, the stopper assembly 300 may be disposed in a portion of the support bracket 225 of the first housing 210. In an embodiment, the stopper assembly 300 may be disposed such that at least a portion of the stopper body 310 is inserted into the stopper accommodation portion 2254 provided in the support bracket 225 and is supported by the fixing pieces 2255. In this case, the stopper assembly 300 may be disposed such that a portion of the pressing member 312 and a portion of the stopper body 310 protrude from the stopper accommodation portion 2254 in opposite directions. In an embodiment, at least a portion of the pressing member 312 may be disposed to be directed toward an area 2253 of the support bracket 225 that corresponds to the rack gear (e.g., the rack gear 228 in FIG. 6A) (e.g., in the x-axis direction), and at least a portion of the stopper body 310 may be disposed to protrude in the opposite direction to that of the pressing member 312 (e.g., in the −x-axis direction). For example, when the support bracket 225 of the first housing 210 and the second side surface member 221 of the second housing 220 are slidably coupled, at least a portion of the pressing member 312 may be disposed to be in close proximity to or in contact with the side surface of the rack gear 228 (e.g., the side surface 2283 in FIG. 6A), and at least a portion of the stopper body 310 may be disposed to be in contact with and to be supported by the side wall the side wall (e.g., the side wall 2223 in FIG. 6A) of the second side surface member 221, or to be in close proximity to the side wall 2223. In an embodiment, in the state of being mounted on the support bracket 225, the stopper assembly 300 may be disposed such that the stopper body 310 and the pressing member 312 are pressed in the same direction (e.g., the x-axis direction) by the first spring 311 and the second spring 313.

Figure 9A:
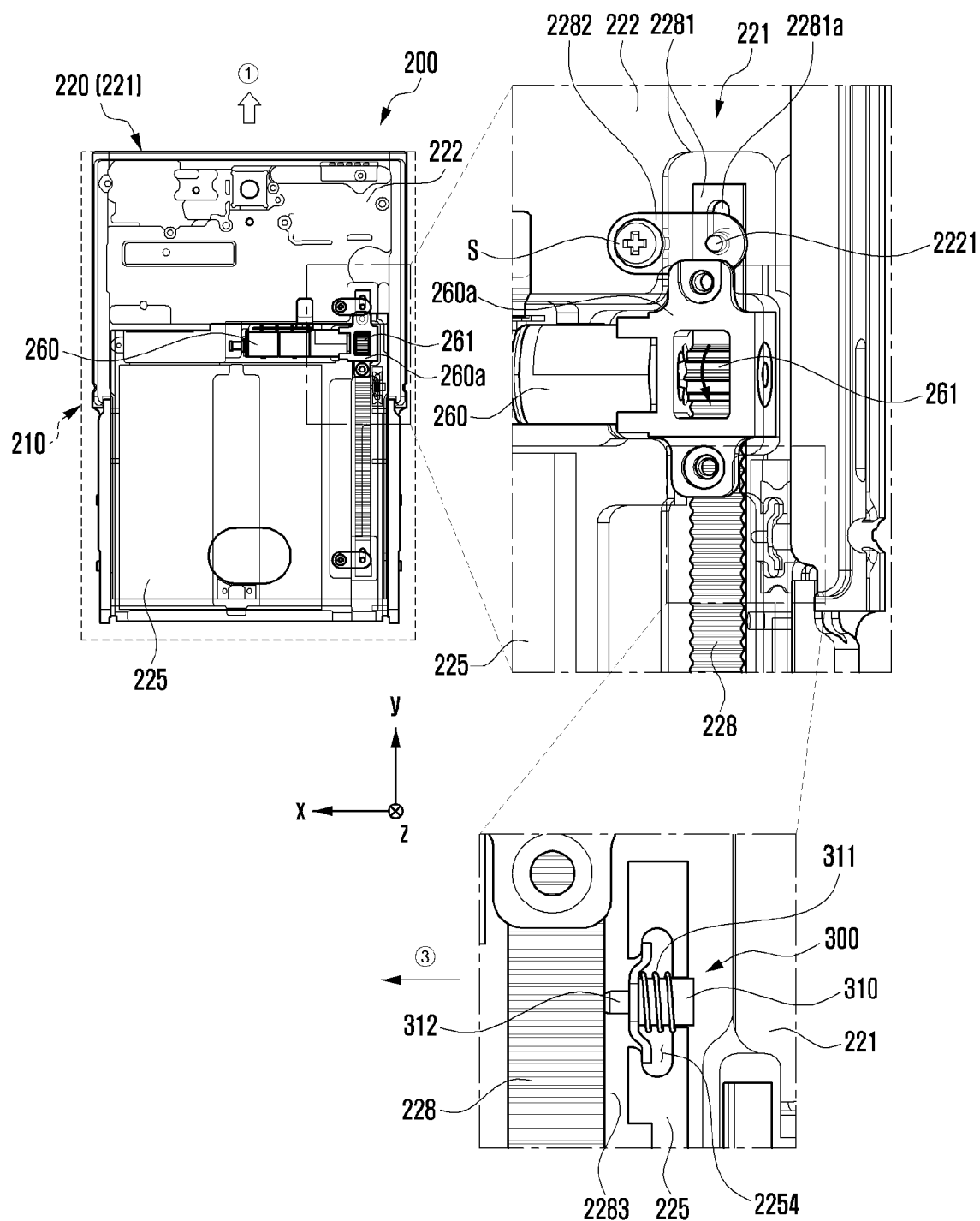
FIG. 9A is a configuration view of an example electronic device illustrating movement of a rack gear according to the driving of a drive motor in a slide-in state according to various embodiments.

FIG. 9A is a configuration view of an example electronic device illustrating movement of a rack gear according to the driving of a drive motor in a slide-in state according to various embodiments of the disclosure.

Referring to FIG. 9A, the electronic device 200 may include a first housing 210 and a second housing 220 coupled to be slid out in a first direction (e.g., direction ①) from the first housing 210 or to be slid in in a second direction (e.g., direction ② in FIG. 9D) opposite to the first direction (e.g., direction ①). In an embodiment, the second side surface member 221 of the second housing 220 may be slidably coupled to the support bracket 225 of the first housing 210. In an embodiment, the electronic device 200 may include a drive motor 260 including a pinion gear 261 disposed on at least a portion of the support bracket 225. In an embodiment, the electronic device 200 may include a rack gear 228 movably disposed on the second side surface member 221 and gear-coupled with the pinion gear 261. In an embodiment, the rack gear 228 may be disposed to be movable by a predetermined reciprocating distance in the first direction (e.g., direction ①) or a second direction (e.g., direction ②) via the elongated holes 2281a provided in the coupling portions 2281 of the opposite ends of the rack gear.

According to various embodiments, the electronic device 200 may include a stopper assembly 300 disposed on at least a portion of the support bracket 225. In an embodiment, the stopper body 310 of the stopper assembly 300 may maintain the state of being accommodated in the stopper accommodation portion 2254 of the support bracket 225, and the pressing member 312 may remain in close proximity to or in contact with the side surface 2283 of the rack gear 2283. In this case, the stopper body 310 and the pressing member 312 may be maintained in the state of being pressed in a third direction (e.g., direction ③) perpendicular to the first direction (e.g., direction ①) in the stopper accommodation portion 2254 of the support bracket 225 by the first spring 311 and the second spring 313.

According to various embodiments, a processor (e.g., the processor 120 in FIG. 1) of the electronic device 200 may detect a triggering signal for switching from the slide-in state to the slide-out state. For example, the triggering signal may include a signal by a user's manipulation of a key button or a touch input of an object displayed on a flexible display. In an embodiment, the electronic device 200 may drive the drive motor 260 based on detection of a triggering signal for slide-out. In an embodiment, the pinion gear 261 of the drive motor 260 may be rotated in a predetermined direction (e.g., counterclockwise), and the rack gear 228 gear-coupled with the pinion gear 261 may be moved in the first direction (e.g., direction ①) along the elongated holes 2281a. For example, the rack gear 228 may be first moved in the first direction (direction ①) by the length of the elongated holes 2281a before the second housing 220 is substantially moved.

Figure 9B:
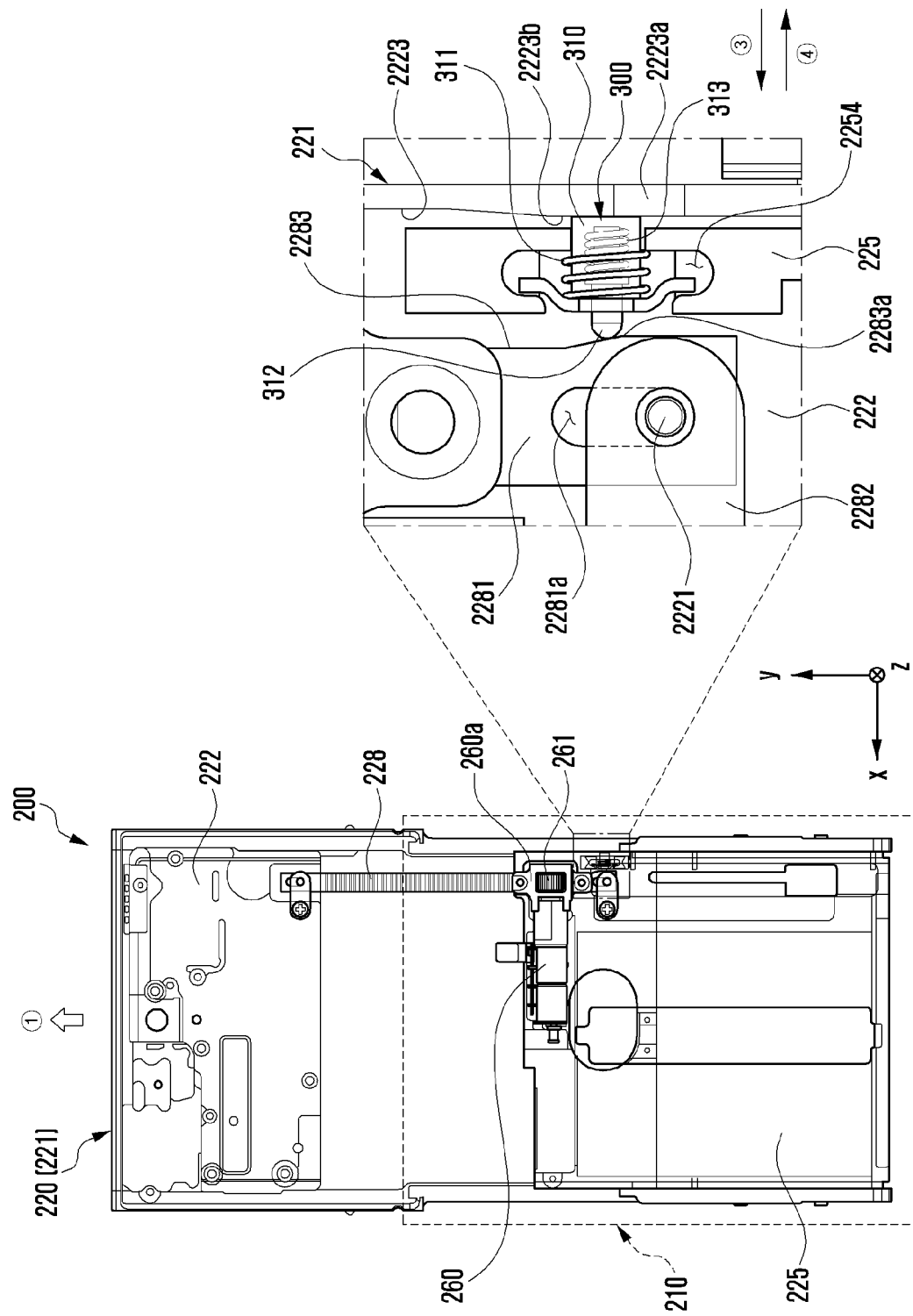
FIG. 9B is a configuration view of an example electronic device illustrating a state in which the pressing member is pressed by the protrusion just before entering the slide-out state according to various embodiments.

FIG. 9B is a configuration view of an example electronic device illustrating a state in which the pressing member is pressed by the protrusion just before entering the slide-out state according to various embodiments of the disclosure.

Referring to FIG. 9B, when the pinion gear 261 is continuously rotated by the drive motor 260, switching close to the slide-out state may be achieved by moving the rack gear 228 gear-coupled with the pinion gear 261 in the first direction (e.g., direction ①) and moving the second housing 220 in the first direction (e.g., direction ①) as well together with the rack gear. In an embodiment, after the rack gear 228 is continuously moved together with the second housing 220 and just before switching to a completely slide-out state is achieved, the pressing member 312 may be accommodated in the stopper body 310 in a fourth direction (e.g., direction ④) opposite to the third direction (e.g., direction ③) by the protrusion 2283a provided on the side surface 2283 of the rack gear 228 while being pressed by the second spring 313. At the same time along with this, the end of the stopper body 310 may be moved in the third direction (e.g., direction ③)

by the inclined portion 2223b provided on the side wall 2223 of the second side surface member 221 while being pressed by the first spring 311. Accordingly, the stopper body 310 and the pressing member 312 may be switched into a state of being compressed by the first and second springs 311 and 313.

Figure 9C:
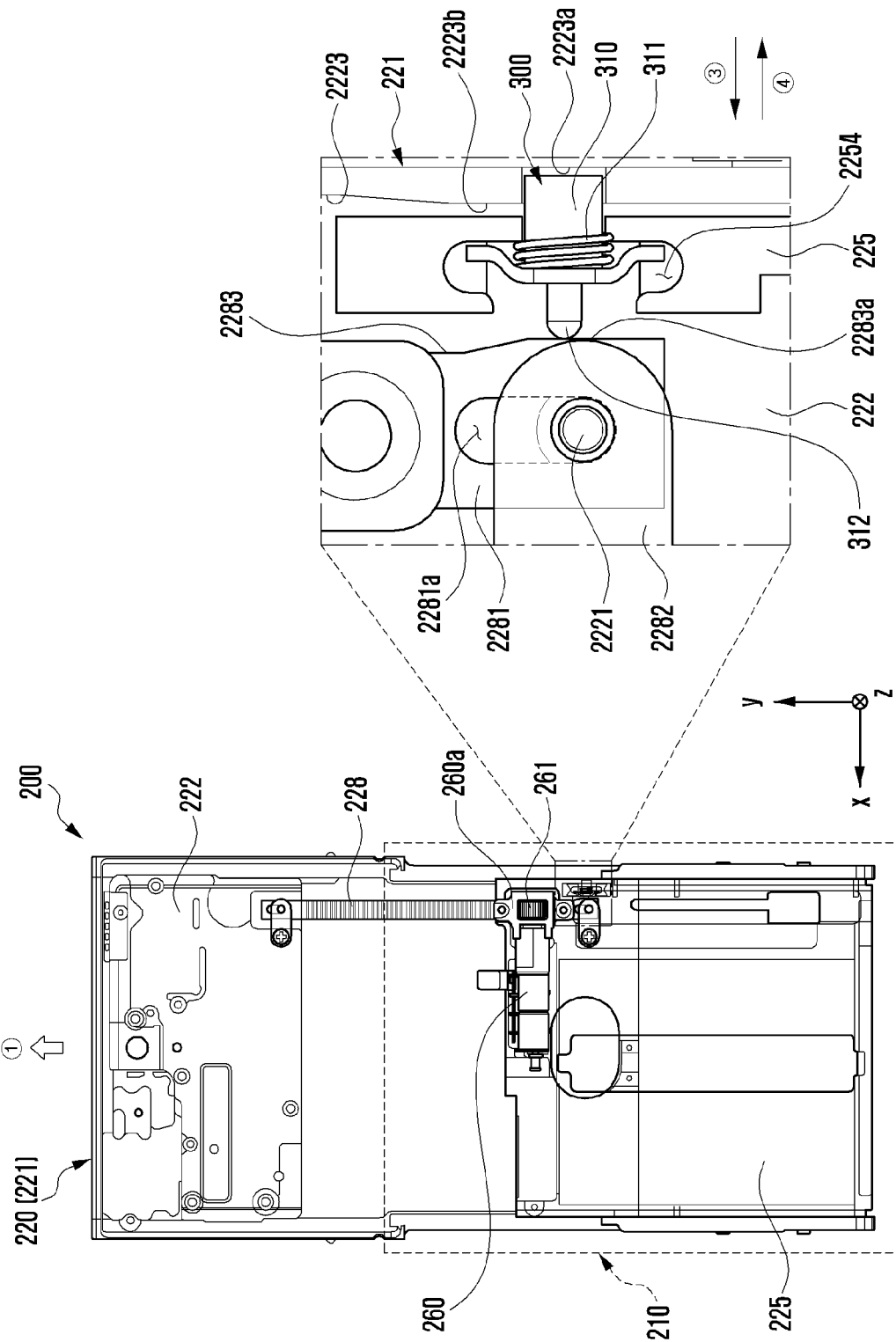
FIG. 9C is a configuration view of an example electronic device illustrating a state in which the stopper body is fastened to the recess in the slide-out state according to various embodiments.

FIG. 9C is a configuration view of an example electronic device illustrating a state in which the stopper body is fastened to the recess in the slide-out state according to various embodiments of the disclosure.

Referring to FIG. 9C, when the second housing 220 is completely slid out of the first housing 210, the pressing member 312 of the stopper assembly 300 may be continuously pressed in the fourth direction (e.g., direction ④) by the protrusion 2283a of the rack gear 228. At the same time, the end portion of the stopper body 310 may be fastened to the recess 2223a provided in the side wall 2223 of the second side surface member 221. In an embodiment, the stopper body 310 may be fastened to the recess 2223a while being pushed in the fourth direction (e.g., direction ④) by the pressing member 312 which is pressed by the protrusion 2283a of the rack gear 228. This is due to the fact that the pressing force of the second spring 313 is configured to be stronger than that of the first spring 311. For example, even when the first spring 311 presses the stopper body 310 in the third direction (e.g., direction ③), since the pressing force of the second spring 313, which presses and supports the pressing member 312, is configured to be stronger, when the pressing member 312 is pressed by the protrusion 2283a, the stopper body 310 may overcome the repulsive force of the first spring 311 in the third direction (e.g., direction ③) and may be fastened to the recess 2223a. Therefore, since the electronic device 200 is maintained in the slide-out state through a locking function in which the stopper body 310 of the stopper assembly 300 is fastened to the recess 2223a, which may help to reduce the damage of the pinion gear 261 and the rack gear 228, which are gear coupled to each other, by an external impact such as a drop.

Figure 9D:
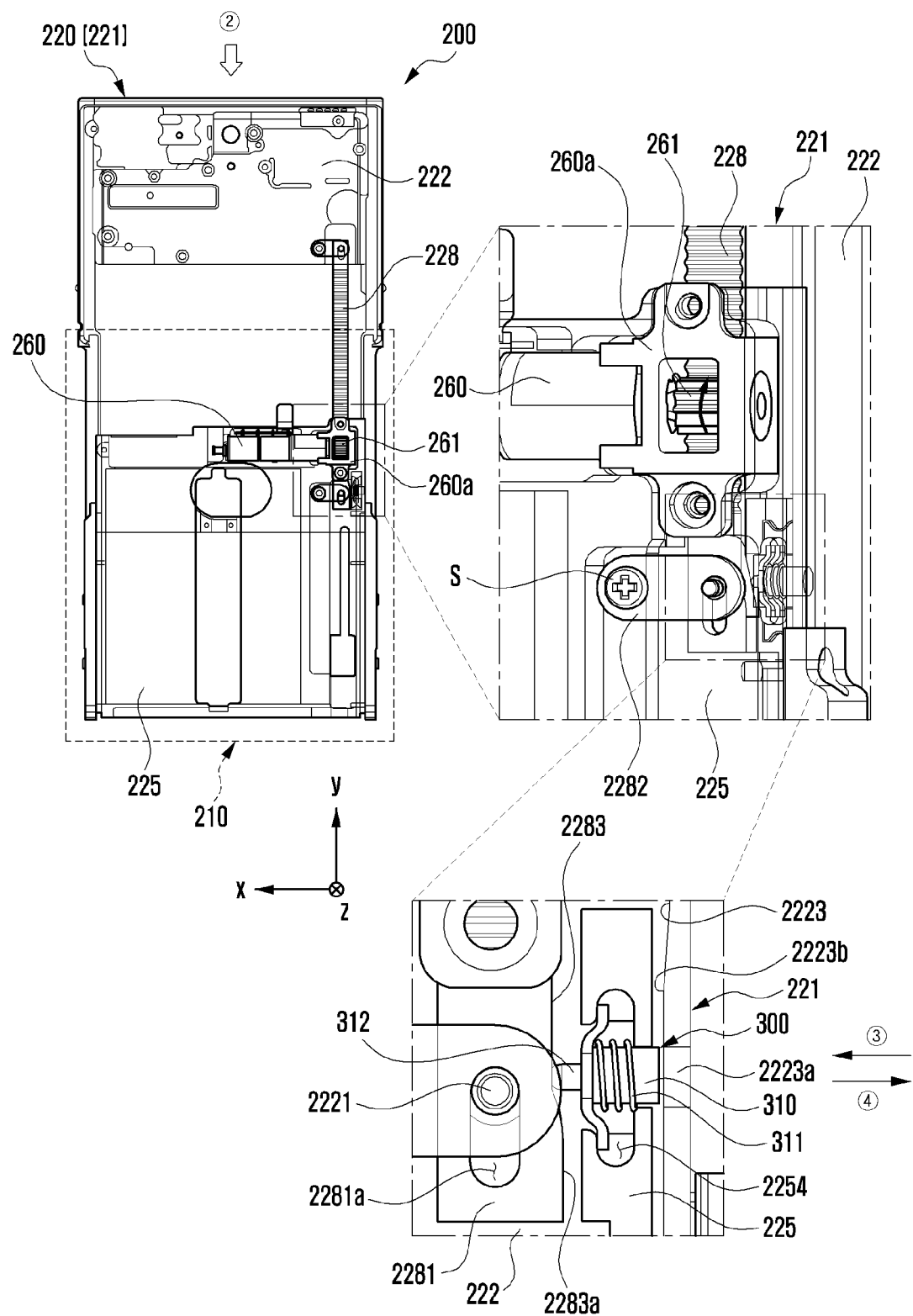
FIG. 9D is a configuration view of an example electronic device illustrating movement of the rack gear according to the driving of the drive motor in the slide-out state according to various embodiments.

FIG. 9D is a configuration view of an example electronic device illustrating movement of the rack gear according to the driving of a drive motor in the slide-out state according to various embodiments of the disclosure.

Referring to FIG. 9D, the processor of the electronic device 200 (e.g., the processor 120 in FIG. 1) may drive the drive motor 260 based on detection of a triggering signal for slide-in. In an embodiment, the pinion gear 261 may be rotated in a predetermined direction (e.g., clockwise) by the drive motor 260, and the rack gear 228 gear-coupled with the pinion gear 261 may be moved in the second direction (e.g., direction ②) along the elongated holes 2281a. For example, the rack gear 228 may be first moved in the second direction (direction C)) by the length of the elongated holes 2281a before the second housing 220 is moved. Through this movement of the rack gear 228, the protrusion 2283a provided on the side surface 2283 of the rack gear 228 may release the pressure of the pressing member 312 of the stopper assembly 300. In an embodiment, when the pressing member 312 separated from the protrusion 2283a is retracted in the third direction (e.g., ③ direction), the pressing force by the second spring 313 may be released or weakened, and the stopper body 310 may be moved in the third direction (e.g., direction ③) by the pressing force of the first spring 311, thereby being switched into the state of being separated from the recess 2223a in the second side surface member 221. In an embodiment, after the stopper body 310 is separated from the recess 2223a, the rack gear 228 may be moved through the continuous rotation of the pinion gear 261, and the second housing 220 may be switched into the slide-in state (e.g., the state in FIG. 9A).

Figure 10:
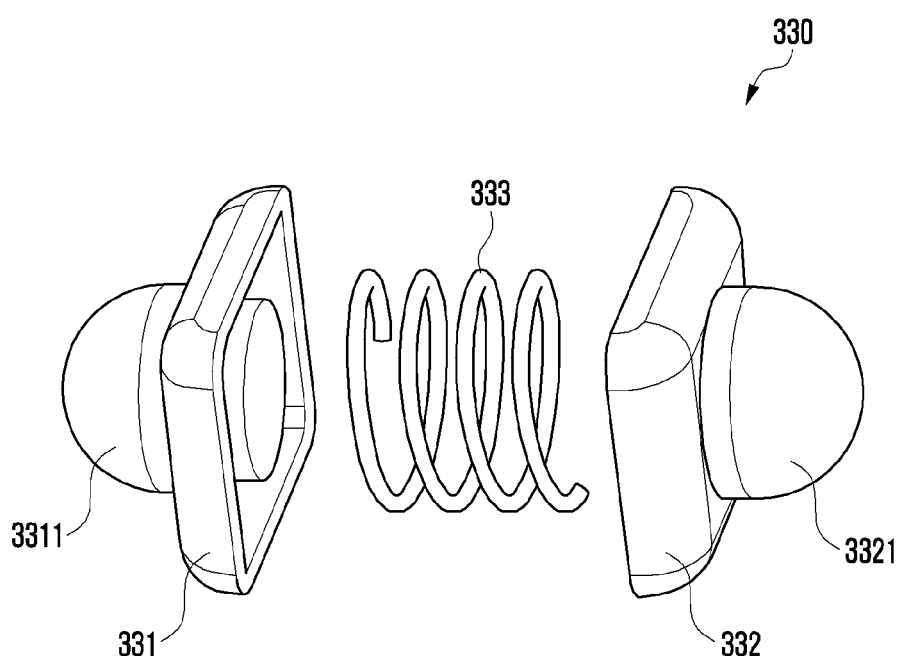
FIG. 10 is an exploded perspective view of an example stopper assembly according to various embodiments.

FIG. 10 is an exploded perspective view of an example stopper assembly according to various embodiments of the disclosure.

The stopper assembly 330 in FIG. 10 is substantially similar to the stopper assembly 300 in FIG. 4, or may further include other embodiments of the stopper assembly.

Referring to FIG. 10, the stopper assembly 330 may include a first stopper 331, a second stopper 332 spaced apart from the first stopper 331, and a spring 333 disposed between the first stopper 331 and the second stopper 332 to press the first stopper 331 and the second stopper 332 in opposite directions. In an embodiment, the spring 333 may include a coil spring. In various embodiments, the spring 333 may include an elastic member (e.g., rubber or silicone) or an elastic member having another shape, such as at least one plate spring. In an embodiment, the first stopper 331 may include a curved first projection 3311 configured to selectively come into contact with a protrusion (e.g., the protrusion 2283a in FIG. 12) of a rack gear (e.g., the rack gear 228 in FIG. 12). In an embodiment, the second stopper 332 may include a curved second projection 3321 configured to be seated in (e.g., fastened to) a recess (e.g., the recess 2223a in FIG. 12) of a second side surface member (e.g., the second side surface member 221 in FIG. 12). In an embodiment, the stopper assembly 330 may be configured such that the pressing force of the spring 333 varies depending on the distance between the first stopper 331 and the second stopper 332. For example, when the interval between the first stopper 331 and the second stopper 332 increases (e.g., when the distance between the first stopper 331 and the second stopper 332 increases), the pressing force of the spring 333 (e.g., elastic force) can be weakened, and when the interval between the first stopper 331 and the second stopper 332 decreases (e.g., the distance between the first stopper 331 and the second stopper 332 decreases), the pressing force (e.g., elastic force) of the spring 333 can be strengthened.

Figure 11:
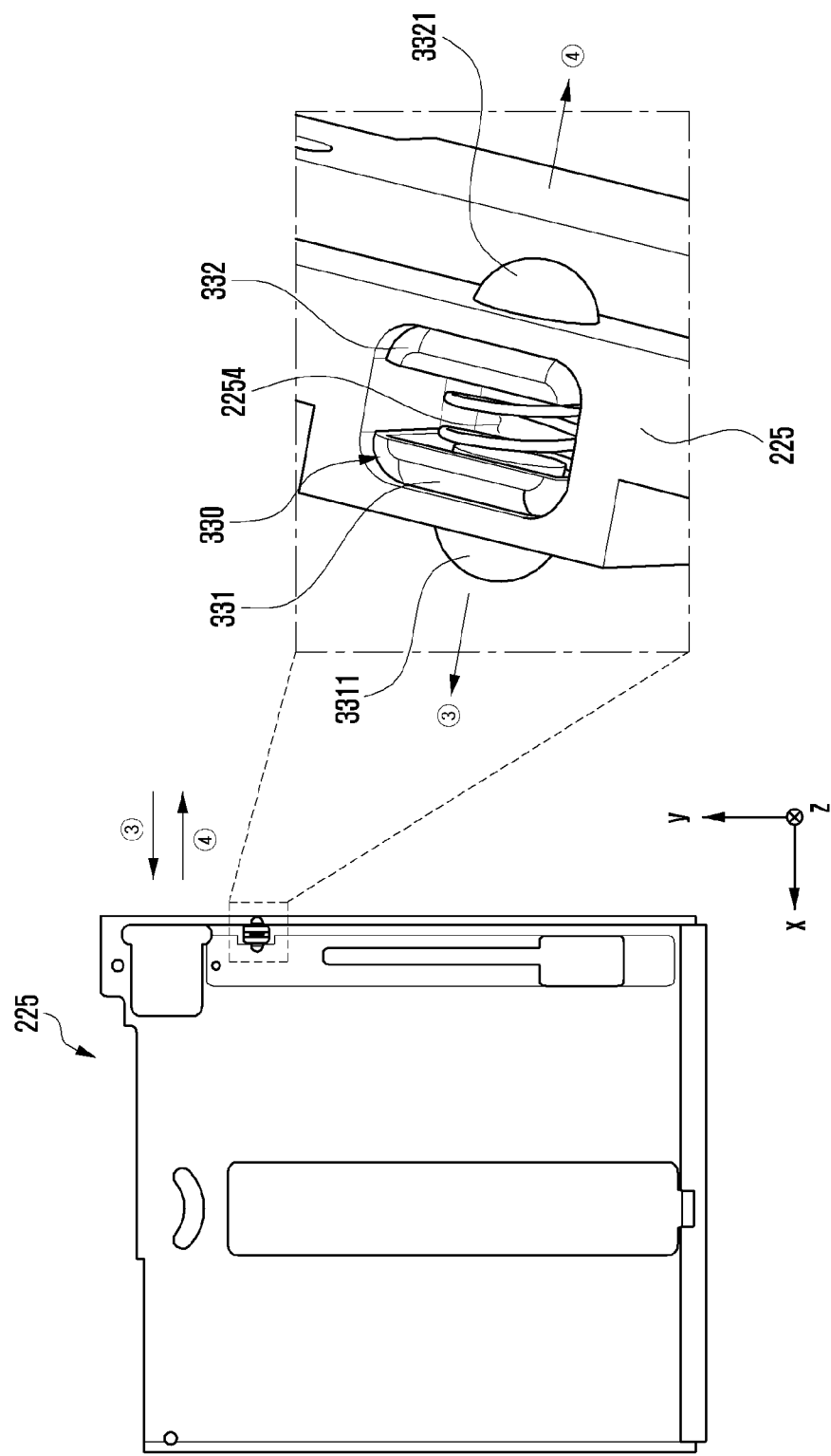
FIG. 11 is a view illustrating a state in which an example stopper assembly of FIG. 10 is coupled to a support bracket according to various embodiments.
Figure 12:
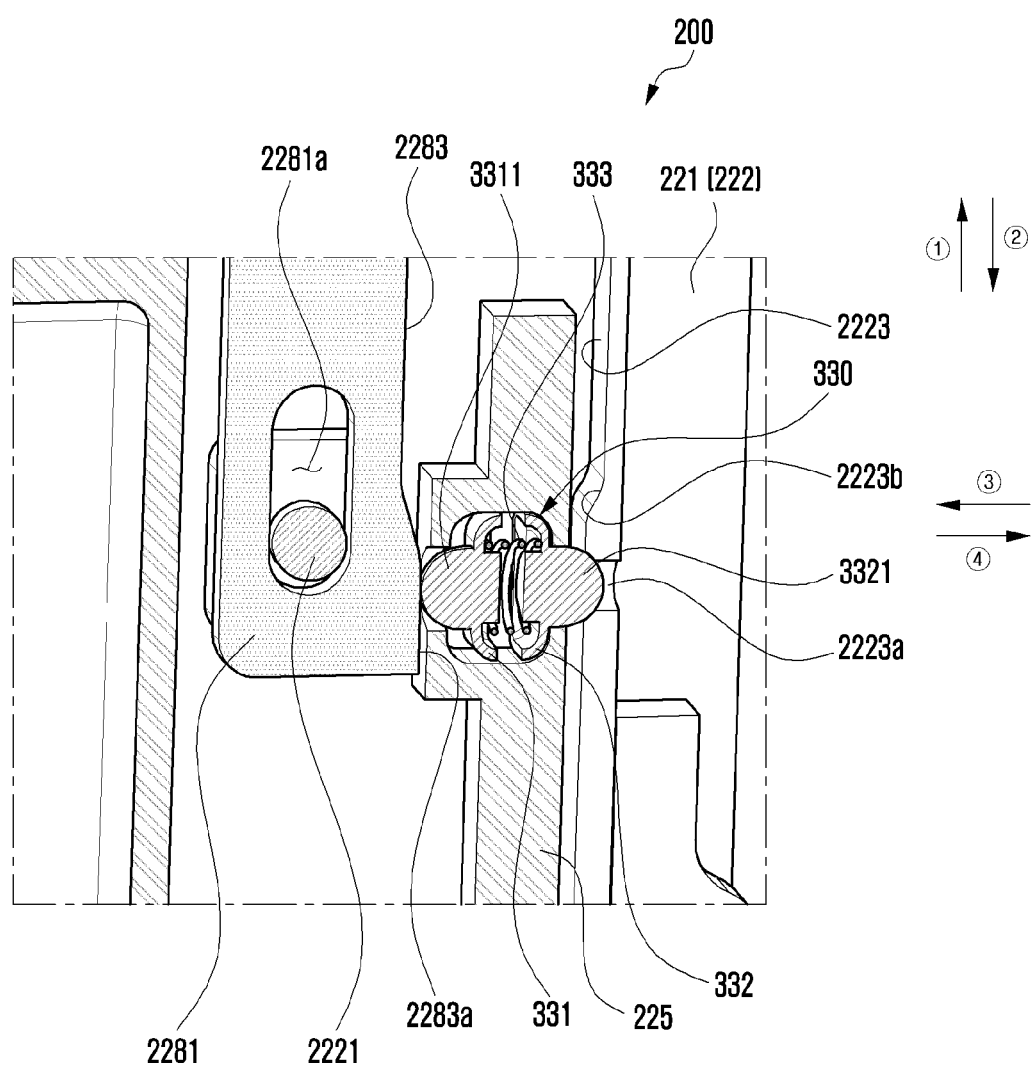
FIG. 12 is a configuration diagram of a portion of an example electronic device illustrating a state in which the stopper assembly of FIG. 10 is pressed by the protrusion of the rack gear according to various embodiments.

FIG. 11 is a view illustrating a state in which the example stopper assembly of FIG. 10 is coupled to a support bracket according to various embodiments of the disclosure. FIG. 12 is a configuration diagram of a portion of an example electronic device illustrating a state in which the example stopper assembly of FIG. 10 is pressed by the protrusion of the rack gear according to various embodiments of the disclosure.

Referring to FIGS. 11 and 12, the stopper assembly 330 may be accommodated in a stopper accommodating portion 2254 (e.g., the stopper accommodation portion 2254 in FIG. 8B) of the support bracket 225 while maintaining a state in which the first stopper 331 and the second stopper 332 are pressed in opposite directions by the spring 333. In this case, the first projection 3311 of the first stopper 331 may protrude from the stopper accommodation portion 2254 in a third direction (e.g., direction ③) toward the side surface 2283 of the rack gear 228, and the second projection 3321 of the second stopper 332 may protrude from the stopper accommodation portion 2254 in a fourth direction (e.g., direction ④) opposite to the first projection 3311. In an embodiment, the first projection 3311 may be at least partially introduced into the stopper accommodation portion 2254 through the pressing in the fourth direction (e.g., direction ④), and the second projection 3321 may be at least partially introduced into the stopper accommodation portion 2254 through the pressing in the third direction (e.g., direction ③).

According to various embodiments, when corresponding to the side surface 2283 of the rack gear 228, the first projection 3311 of the stopper assembly 330 is not pressed, and when being brought into contact with the protrusion 2283a provided on the side surface 2283 according to the movement of the rack gear 228, the first projection 3311 of the stopper assembly 330 may be switched into the state of being pressed in the fourth direction (e.g., direction ④) by the protrusion 2283a. In an embodiment, when corresponding to the side wall 2223 of the second side surface member 221, the second projection 3321 of the stopper assembly 330 is not pressed, and when being brought into contact with the inclined portion 2223b according to the movement of the rack gear 228 and the second side surface member 221, the second projection 3321 of the stopper assembly 330 may be switched into the state of being gradually pressed. In an embodiment, the second projection 3321 may be maintained in a state of being pressed by the spring 333 even when the second projection 3321 passes through the inclined portion 2223b and is seated in the recess 2223a in the side wall 2223 according to the movement of the rack gear 228 and the second side surface member 221.

According to various embodiments, when the electronic device 200 is in the slide-out state, the interval between the first stopper 331 and the second stopper 332 decreases by the pressing of the first protrusion 3311 by the protrusion 2283a and the pressing of the second protrusion 3321 by the recess 2223a so that the pressing force can be strengthened. Therefore, by the stopper assembly 330 to which the increased pressing force of the spring 333 is applied, the second housing (e.g., the second housing 220 in FIG. 4) including the second side surface member 221 may maintain the slide-out state.

According to various embodiments, while the electronic device 200 is being switched from the slide-out state to the slide-in state or when the electronic device 200 is switched to the slide-in state, since the interval between the first stopper 331 and the second stopper 332 is increased by the release of pressure of the first projection 3311 by the protrusion 2283a and the release of pressure of the second projection 3321 by the recess 2223a and the inclined portion 2223b, the pressing force can be weakened. Accordingly, the weakened pressing force of the spring 333 of the stopper assembly 330 may help to reduce the load of the drive motor and to achieve the smooth sliding motion of the second housing 220.

FIGS. 13A, 13B, 13C, 13D, 13E, and 13F are views illustrating operating states of an example stopper assembly interlocked with an example rack gear according to a sliding motion of a second housing according to various embodiments of the disclosure.

In describing the electronic device of FIGS. 13A, 13B, 13C, 13D, 13E, and 13F, the same reference numerals are assigned to components substantially the same as those of the electronic device of FIGS. 9A, 9B, 9C, and 9D, and a detailed description thereof may not be repeated.

Figure 13A:
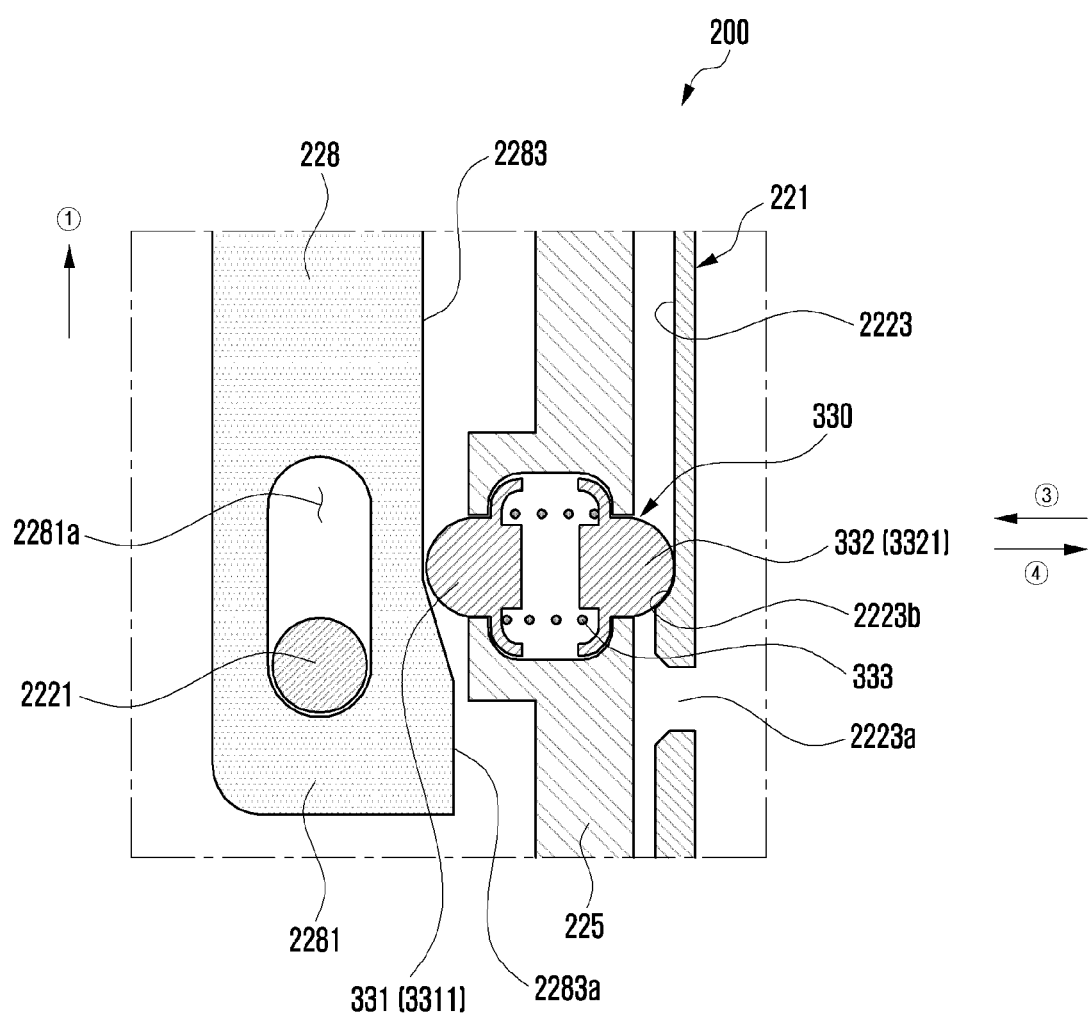
FIGS. 13A, 13B, 13C, 13D, 13E, and 13F are views illustrating operating states of an example stopper assembly interlocked with a rack gear according to a sliding motion of a second housing according to various embodiments.

Referring to FIG. 13A, when the rack gear 228 gear-coupled with the pinion gear 261 is moved in the first direction (e.g., direction ①) and the second housing (e.g., the second housing 220 is FIG. 9A) is also moved in the first direction (e.g., ① direction) together with the rack gear 228 according to the continuous rotation of the pinion gear (e.g., the pinion gear 261 in FIG. 9A) by the driving motor (e.g., the driving motor 260 of FIG. 9A), the electronic device 200 may be in the state of being switched close to slide-out. In this case, the rack gear 228 may be first moved in the first direction (direction ①) by the length of the elongated holes 2281a before the second housing 220 is substantially moved.

According to various embodiments, before the stopper assembly 330 comes into contact with the protrusion 2283a of the rack gear 228, the first projection 3311 of the first stopper 331 of the stopper assembly 330 is in contact with or in close proximity to the side surface 2283 of the rack gear 228, whereby the first projection 3311 may be weakly pressed or may not be pressed by the spring 333. In addition, the second projection 3321 of the second stopper 332 is in contact with or in close proximity to the side wall 2223 of the second side surface member 221, whereby the second projection 3321 may be weakly pressed or may not be pressed by the spring 333. In this case, through the state of being weakly pressed or not being pressed by the spring 333, the first stopper 331 and the second stopper 332 may help smooth sliding motion of the second side surface member 221 of the second housing 220.

Figure 13B:
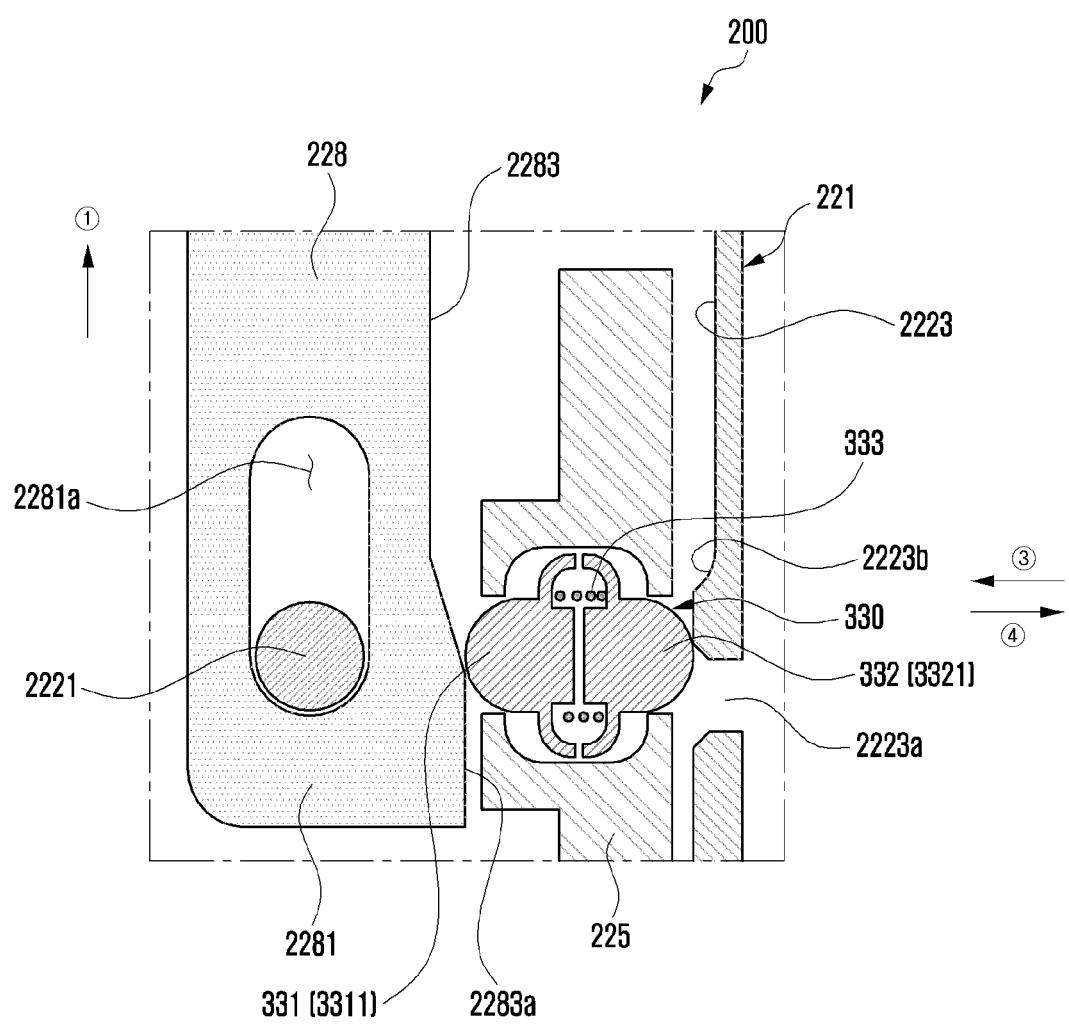

Referring to FIG. 13B, when the rack gear 228 gear-coupled with the pinion gear 261 is moved in the first direction (e.g., direction ①) and the second housing (e.g., the second housing 220 is FIG. 9A) is also moved in the first direction (e.g., ① direction) together with the rack gear 228 according to the continuous rotation of the pinion gear (e.g., the pinion gear 261 in FIG. 9A) by the driving motor (e.g., the driving motor 260 of FIG. 9A), the electronic device 200 may be in the state of being switched closer to slide-out compared to the case of FIG. 13A. In this case, after the rack gear 228 is continuously moved together with the second side surface member 221 and just before being completely switched to the slide-out state, the first stopper 331 of the stopper assembly 330 may be moved in the fourth direction (e.g., direction ④) along the protrusion 2283a that gradually tapers from the side surface 2283 of the rack gear 228 while being pressed by the spring 333. In addition, the second stopper 332 may be moved in the third direction (e.g., direction ③) along the inclined portion 2223b provided on the side wall 2223 of the second side surface member 221 while being pressed by the spring. In this case, the interval between the first stopper 331 and the second stopper 332 of the stopper assembly 330 may be configured to decrease and to have a stronger pressing force than that in the state of the stopper assembly 330 of FIG. 13A by the spring 333.

Figure 13C:
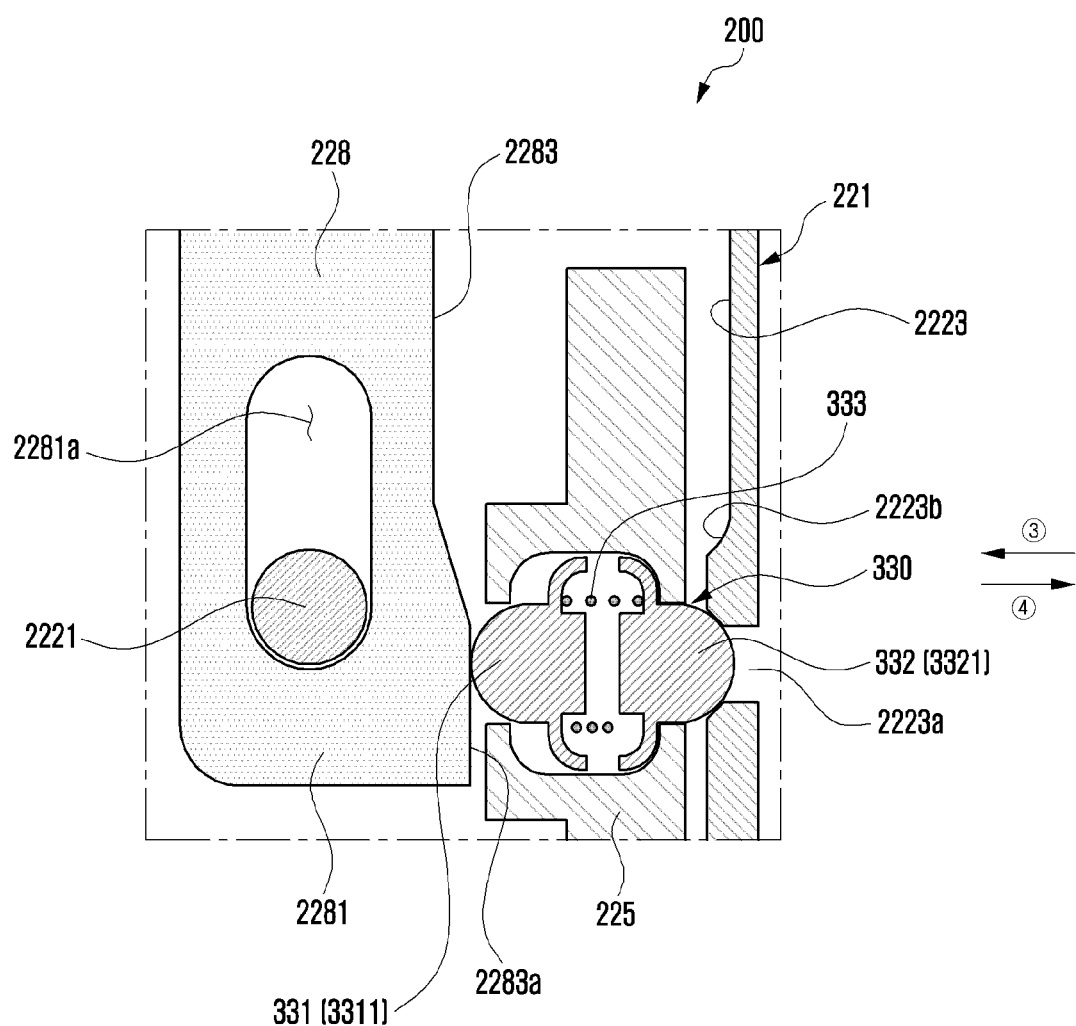

Referring to FIG. 13C, when the electronic device 200 is completely switched to the slide-out state, the rack gear 228 and the second side surface member 221 continuously move in the first direction (e.g., direction ①), whereby the first stopper 331 is continuously pressed by the protrusion 2283a of the rack gear 228, and the second projection 3321 of the second stopper 332 may be seated in the recess 2223a provided in the side wall 2223 of the second side surface member 221. For example, since the stopper assembly 330 has a pressing force stronger than that in the state of the stopper assembly 330 of FIG. 13A by the pressing of the first stopper 331 by the protrusion 2283a, and a portion of the second stopper 332 (e.g., the second projection 3321) is seated in the recess 2223a, the stopper assembly 330 may help the second housing 220 maintain a slide-out state.

Figure 13D:
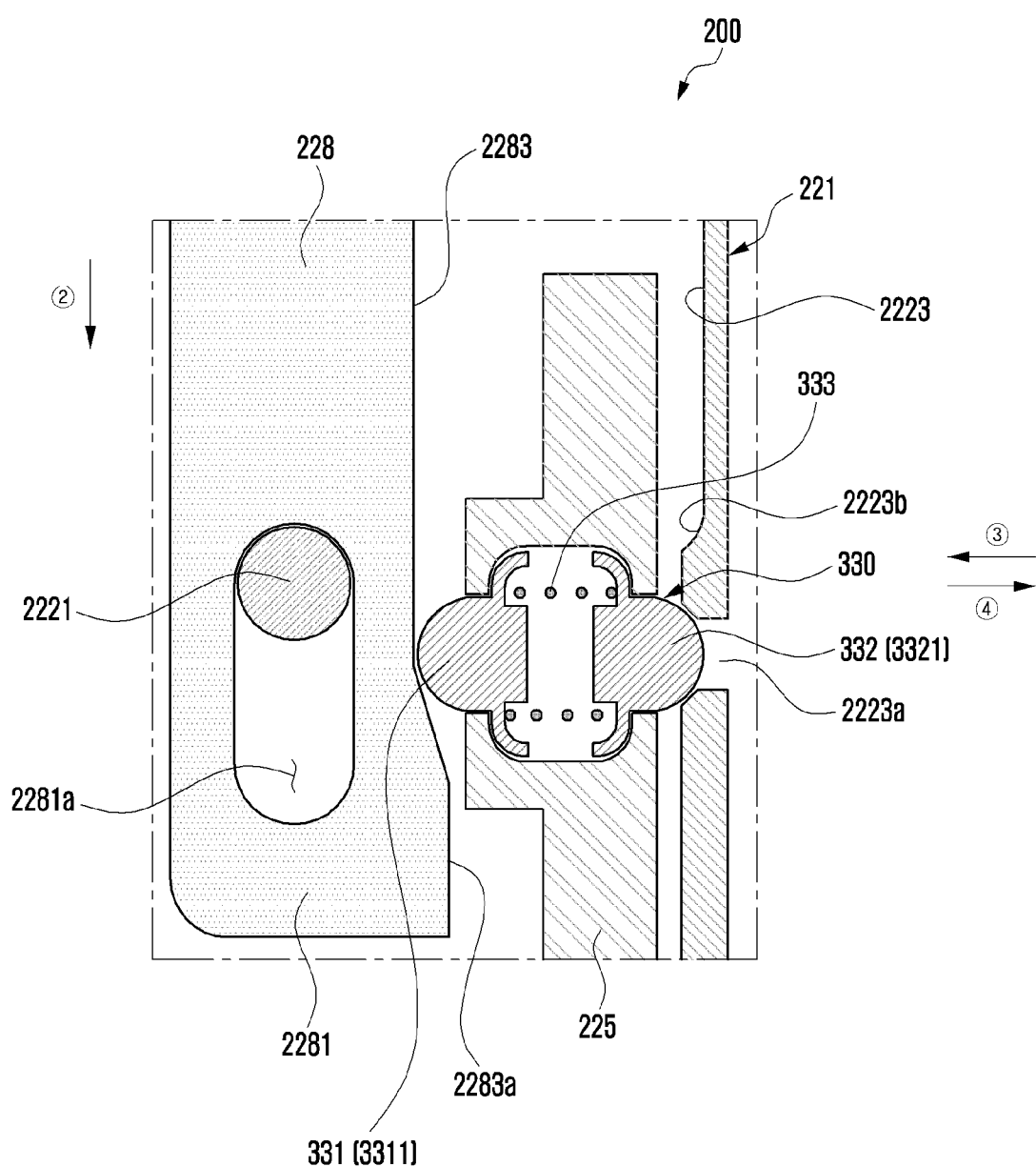

Referring to FIG. 13D, when the electronic device 200 is switched from the slide-out state to the slide-in state, the pinion gear 261 may be rotated in a predetermined direction by the drive motor 260, and the rack gear 228 gear-coupled with the pinion gear 261 may be moved in the second direction (e.g., direction ②) along the elongated hole 2281a. For example, before the second side surface member 221 is moved, the rack gear 228 may be first moved in the second direction (e.g., direction ②) by the length of the elongated hole 2281*a*, whereby the pressing force of the spring 333 on the first stopper 331 pressed by the protrusion 2283*a* may be weaker than that in the state of the stopper assembly 330 in FIG. 13C.

Figure 13E:
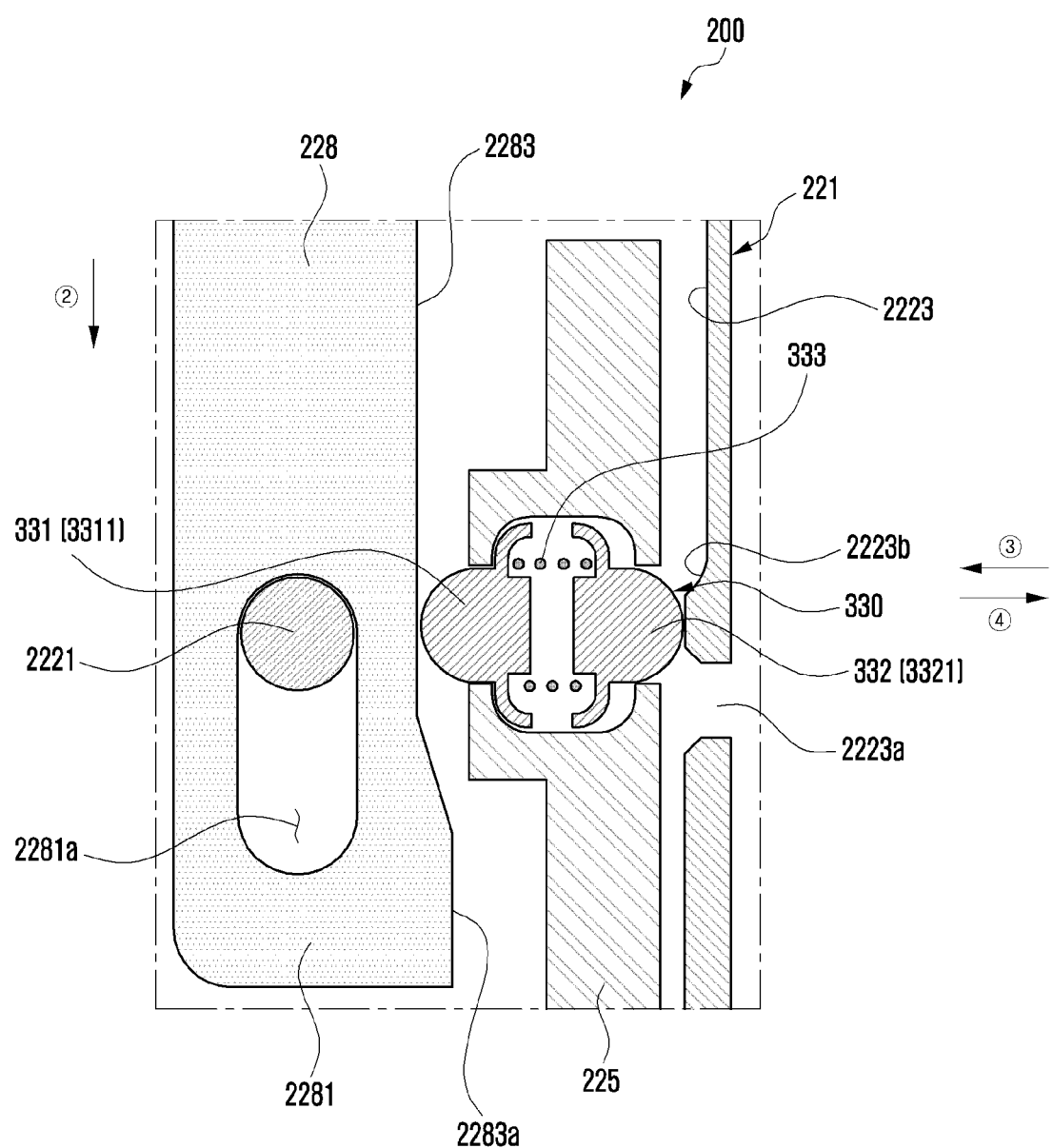
Figure 13F:
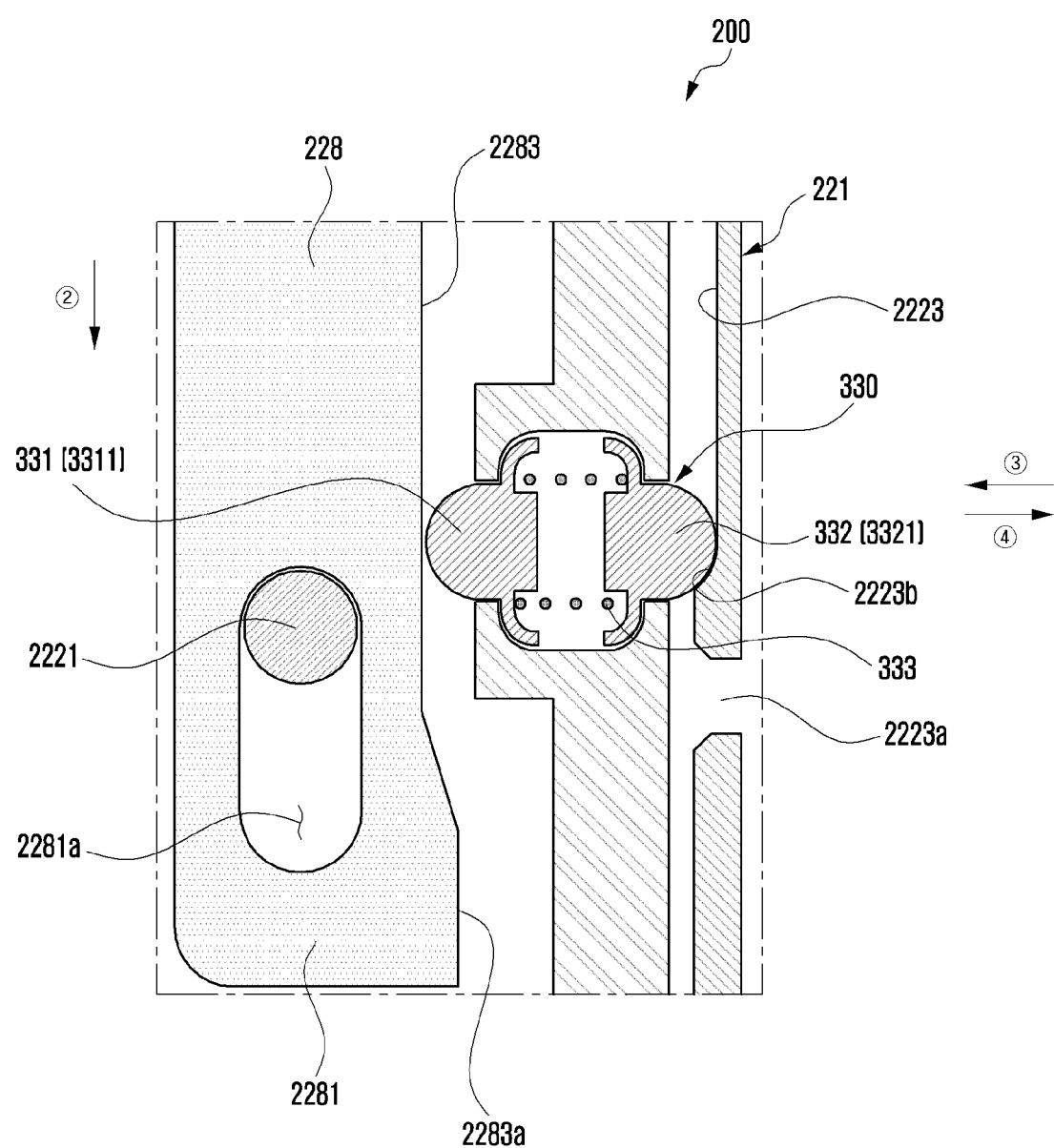

Referring to FIGS. 13E and 13F, when the rack gear 228 and the second side surface member 221 move in the second direction (e.g., direction ②), the second projection 3321 of the stopper assembly 330 is separated from the recess 2223*a* of the second side surface member 221 and passes through the inclined portion 2223*b* to be in contact with or in close proximity to the side wall 2223, whereby the pressing force of the first and second stoppers 331 and 332 by the spring 333 may be weaker than that in the state of the stopper assembly 330 in FIG. 13D. Accordingly, the weakened pressing force of the stopper assembly 330 may help the second housing 220 smoothly slide.

In various embodiments, the stopper assembly 330 may be disposed in the second housing 220, and in the slide-out state, the recess 2223*a* where the pressing member 312 of the stopper assembly 300 is engaged may be disposed in the first housing 210.

According to various embodiments, an electronic device (e.g., the electronic device 200 in FIG. 9C) may include a first housing (e.g., the first housing 210 in FIG. 9C), a second housing (e.g., the second housing 220 in FIG. 9C) coupled to be slidable from the first housing, and a flexible display (e.g., the flexible display 230 in FIG. 4) disposed to be supported by the first housing and the second housing and having a display area which varies depending on whether the second housing is slid in or slid out. The electronic device may include a stopper assembly (e.g., the stopper assembly 300 in FIG. 9C) disposed in the first housing. The stopper assembly may include a stopper body (e.g., the stopper body 310 in FIG. 9C) elastically coupled to at least a portion of the first housing, and a pressing member (e.g., the pressing member 312 in FIG. 9C) coupled to the stopper body and configured to come into contact with at least a portion of a protrusion (e.g., the protrusion 2283*a* in FIG. 9C) located in the second housing, wherein a slide-out state may be maintained when the stopper body is fastened to (or at least partially received in) a recess (e.g., the recess 2223*a* in FIG. 9C) in the second housing via the pressing member that is pressed by the protrusion.

According to various embodiments, the electronic device may include a drive motor (e.g., the drive motor 260 in FIG. 9C) included in the first housing and including a pinion gear (e.g., the pinion gear 261 in FIG. 9C).

According to various embodiments, the electronic device may include a rack gear (e.g., the rack gear 228 in FIG. 9C) included in the second housing and gear-coupled with the pinion gear, and the protrusion may be disposed on the rack gear.

According to various embodiments, the pressing member may be elastically coupled to the stopper body.

According to various embodiments, the second housing may be switched to a slide-in state when the stopper body is separated from (or no longer partially received in) the recess through retraction of the protrusion when the second housing is switched from the slide-out state to the slide-in state.

According to various embodiments, the rack gear may be disposed to be movable by a predetermined reciprocating distance in the same direction as the sliding direction of the second housing.

According to various embodiments, the rack gear may be disposed to be first moved by the pinion gear before the second housing moves from the slide-in state or the slide-out state thereof.

According to various embodiments, the stopper body may be disposed to be pressed in a direction perpendicular to the sliding direction of the second housing by a first spring (e.g., the first spring 311 in FIG. 7A).

According to various embodiments, the stopper body may include a pressing member accommodation groove (e.g., the pressing member accommodation recess 3101 in FIG. 7A) configured to accommodate at least a portion of the pressing member, and the pressing member may be disposed to be pressed in a direction perpendicular to the sliding direction of the second housing by a second spring (e.g., the second spring 313 in FIG. 7A) in the pressing member accommodation groove.

According to various embodiments, the stopper body and the pressing member may be disposed to be pressed in the same direction.

According to various embodiments, the pressing force applied to the pressing member by the second spring may be configured to be stronger than the pressing force applied to the stopper body by the first spring.

According to various embodiments, the protrusion may be disposed at a position to press the pressing member just before the second housing is switched to the slide-out state, and the recess may be disposed at a position to accommodate a portion of the stopper body when the second housing is completely switched to the slide-out state.

According to various embodiments, the recess may extend along a side wall (e.g., the side wall 2223 in FIG. 9C) provided in the second housing to correspond to the stopper body, and the electronic device may include an inclined portion (e.g., the inclined portion 2223*b* in FIG. 9C) tapered between the recess and the side wall so as to gradually approach the rack gear.

According to various embodiments, the protrusion may have a tapered shape that further protrudes toward an end portion of a side surface of the rack gear.

According to various embodiments, the first housing may include a support bracket (e.g., the support bracket 225 in FIG. 9C) disposed in the inner space thereof and slidably coupled to the second housing, and the drive motor and the stopper assembly may be disposed on the support bracket.

According to various embodiments, the electronic device may include a bendable support member (e.g., the support member 240 in FIG. 4) connected to the second housing and disposed under the flexible display to support at least a portion of the flexible display, and wherein, in the slide-in state, at least a portion of the support member may be accommodated in an inner space of the first housing together with the flexible display.

According to various embodiments, an electronic device (e.g., the electronic device 200 in FIG. 9C) may include a first housing (e.g., the first housing 210 in FIG. 9C), a second housing (e.g., the second housing 220 in FIG. 9C) coupled to be slidable from the first housing and including a fastening groove (e.g., the fastening groove 2223*a* in FIG. 9C), and a flexible display (e.g., the flexible display 230 in FIG. 4) disposed to be supported by the first housing and the second housing and having a display area which varies depending on whether the second housing is slid in or slid out. The electronic device may include a drive motor (e.g., the drive motor 260 in FIG. 9C) disposed in the first housing and including a pinion gear (e.g., the pinion gear 261 in FIG. 9C), a rack gear (e.g., the rack gear 228 in FIG. 9C) disposed in the second housing to be gear-coupled with the pinion gear and including a protrusion (e.g., the protrusion 2283a in FIG. 9C) at one end thereof, and a stopper assembly (e.g., the stopper assembly 330 in FIG. 12) disposed in the first housing. The stopper assembly may include a first stopper (e.g., the first stopper 331 in FIG. 12) facing the rack gear, a second stopper (e.g., the stopper 332 in FIG. 12) facing away from the first stopper, and an elastic member (e.g., the spring 333 in FIG. 12) configured to press the first stopper and the second stopper in opposite directions between the first stopper and the second stopper, wherein, in a state in which the elastic force of the stopper assembly increases (e.g., by the first stopper being pressed by the protrusion), at least a portion of the second stopper is seated or received in the recess so that the slide-out state is maintained.

According to various embodiments, the rack gear may be disposed to be movable by a predetermined reciprocating distance in the same direction as the sliding direction of the second housing.

According to various embodiments, the rack gear may be disposed to be first moved by the pinion gear before the second housing moves from the slide-in state or the slide-out state thereof.

According to various embodiments, the second housing may be switched to a slide-in state when the stopper body is separated from the recess through retraction of the protrusion when the second housing is switched from the slide-out state to the slide-in state.

The embodiments of the disclosure disclosed in this specification and drawings are provided merely to propose specific examples in order to easily describe the technical features according to the embodiments of the disclosure and to help understanding of the embodiments of the disclosure, and are not intended to limit the scope of the embodiments of the disclosure. Accordingly, the scope of the various embodiments of the disclosure is to be construed in such a manner that, in addition to the embodiments disclosed herein, all changes or modifications derived from the technical idea of the various embodiments of the disclosure are included in the scope of the various embodiments of the disclosure.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:
   a first housing;
   a second housing coupled to be slidable with respect to the first housing;
   a flexible display supported by the first housing and the second housing and having a display area that varies based on a slide movement of the second housing; and
   a stopper assembly disposed in the first housing,
   wherein the stopper assembly comprises:
      a stopper body elastically coupled to at least a portion of the first housing; and
      a pressing member coupled to the stopper body and configured to come into contact with at least a portion of a protrusion located in the second housing, and
   wherein, in a slide-out state, the stopper body is at least partially accommodated in a recess in the second housing by pressure from the pressing member being pressed by the protrusion.

2. The electronic device of claim 1, further comprising a drive motor included in the first housing and comprising a pinion gear.

3. The electronic device of claim 2, further comprising a rack gear included in the second housing and gear-coupled with the pinion gear,
   wherein the protrusion is disposed on the rack gear.

4. The electronic device of claim 1, wherein the pressing member is elastically coupled to the stopper body.

5. The electronic device of claim 1, wherein, in a slide-in state, the stopper body retracts from the recess by a release of pressure from the pressing member being no longer pressed by the protrusion.

6. The electronic device of claim 3, wherein the rack gear is disposed to be movable by a predetermined reciprocating distance in a same direction as a sliding direction of the second housing.

7. The electronic device of claim 3, wherein the rack gear is disposed to be moved by the pinion gear before the second housing moves from a slide-in state or the slide-out state thereof.

8. The electronic device of one of claim 1, further comprising a first spring for pressing the stopper body in a direction perpendicular to a sliding direction of the second housing.

9. The electronic device of claim 8, further comprising a second spring,
   wherein the stopper body comprises a pressing member accommodation groove configured to accommodate at least a portion of the pressing member, and
   wherein the pressing member is disposed to be pressed in a direction perpendicular to the sliding direction of the second housing by the second spring.

10. The electronic device of claim 9, wherein the stopper body and the pressing member are disposed to be pressed in a same direction.

11. The electronic device of claim 10, wherein a pressing force applied to the pressing member by the second spring is configured to be stronger than a pressing force applied to the stopper body by the first spring.

12. The electronic device of claim 1, wherein the protrusion is disposed at a position to press the pressing member just before the second housing is switched to the slide-out state, and
   wherein the recess is disposed at a position to accommodate a portion of the stopper body when the second housing is completely switched to the slide-out state.

13. The electronic device of claim 3, wherein the recess extends along a side wall provided in the second housing to correspond to the stopper body, and
   wherein the electronic device further comprises an inclined portion tapered between the recess and the side wall to gradually approach the rack gear.

14. The electronic device of claim 3, wherein the protrusion has a tapered shape that further protrudes toward an end portion of a side surface of the rack gear.

15. The electronic device of claim 2, wherein the first housing comprises a support bracket disposed in an inner space thereof and slidably coupled to the second housing, and
   wherein the drive motor and the stopper assembly are disposed on the support bracket.

16. The electronic device of claim 1, further comprising a bendable support member connected to the second housing and disposed under the flexible display to support at least a portion of the flexible display,
   wherein, in a slide-in state, at least a portion of the support member is accommodated in an inner space of the first housing together with the flexible display.

17. An electronic device comprising:
   a first housing;
   a second housing coupled to be slidable from the first housing and comprising a recess;
   a flexible display supported by the first housing and the second housing and having a display area that varies based on the second housing being slid in or slid out;
   a drive motor disposed in the first housing and including a pinion gear;
   a rack gear disposed in the second housing to be gear-coupled with the pinion gear and comprising a protrusion at one end thereof; and
   a stopper assembly disposed in the first housing,
   wherein the stopper assembly comprises:
      a first stopper facing the rack gear;
      a second stopper facing away from the first stopper; and
      an elastic member configured to press the first stopper and the second stopper in opposite directions between the first stopper and the second stopper, and
   wherein, in a state in which an elastic force of the stopper assembly is increased by the protrusion pressing the first stopper, at least a portion of the second stopper is seated in the recess.

18. The electronic device of claim 17, wherein the rack gear is disposed to be movable by a predetermined reciprocating distance in a same direction as a sliding direction of the second housing.

19. The electronic device of claim 17, wherein the rack gear is disposed to be moved by the pinion gear before the second housing moves from a slide-in state or a slide-out state thereof.

20. The electronic device of claim 17, wherein the second housing is switched to a slide-in state when the stopper assembly is separated from the recess through retraction of the protrusion when the second housing is switched from a slide-out state to the slide-in state.

* * * * *